United States Patent
Heeter et al.

(10) Patent No.: US 12,018,621 B1
(45) Date of Patent: Jun. 25, 2024

(54) ADJUSTABLE DEPTH TIP TREATMENT WITH ROTATABLE RING WITH POCKETS FOR A FAN OF A GAS TURBINE ENGINE

(71) Applicants: Rolls-Royce North American Technologies Inc., Indianapolis, IN (US); Rolls-Royce Corporation, Indianapolis, IN (US)

(72) Inventors: Robert W. Heeter, Indianapolis, IN (US); Daniel E. Molnar, Jr., Indianapolis, IN (US); Michael S. Krautheim, Indianapolis, IN (US)

(73) Assignees: Rolls-Royce North American Technologies Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 18/234,657

(22) Filed: Aug. 16, 2023

(51) Int. Cl.
| | |
|---|---|
| *F02C 9/22* | (2006.01) |
| *F01D 17/14* | (2006.01) |
| *F02K 3/06* | (2006.01) |
| *F04D 29/54* | (2006.01) |

(52) U.S. Cl.
CPC .............. *F02C 9/22* (2013.01); *F01D 17/141* (2013.01); *F02K 3/06* (2013.01); *F04D 29/542* (2013.01); *F05D 2220/36* (2013.01); *F05D 2240/12* (2013.01); *F05D 2240/14* (2013.01)

(58) Field of Classification Search
CPC . F02C 9/22; F01D 17/141; F02K 3/06; F04D 29/542; F05D 2220/36; F05D 2240/12; F05D 2240/14
See application file for complete search history.

(56) References Cited

U.S. PATENT DOCUMENTS

| | | |
|---|---|---|
| 4,086,022 A | 4/1978 | Freeman et al. |
| 5,137,419 A | 8/1992 | Waterman |
| 5,762,470 A | 6/1998 | Gelmedov et al. |
| 6,231,301 B1 | 5/2001 | Barnett et al. |
| 6,409,470 B2 | 6/2002 | Allford et al. |
| 6,497,551 B1 | 12/2002 | Hand et al. |
| 6,514,039 B1 | 2/2003 | Hand |
| 6,619,909 B2 | 9/2003 | Barnett et al. |
| 6,648,591 B2 | 11/2003 | Collins |
| 6,685,426 B2 | 2/2004 | Clark |
| 6,736,594 B2 | 5/2004 | Irie et al. |
| 6,832,890 B2 | 12/2004 | Booth |
| 6,905,305 B2 | 6/2005 | James |
| 6,935,833 B2 | 8/2005 | Seitz |
| 7,186,072 B2 | 3/2007 | Seitz |
| 7,210,905 B2 | 5/2007 | Lapworth |
| 7,575,412 B2 | 8/2009 | Seitz |

(Continued)

FOREIGN PATENT DOCUMENTS

| | | |
|---|---|---|
| CN | 113217469 A | 8/2021 |
| DE | 102007056953 | 10/2015 |

(Continued)

*Primary Examiner* — Eric J Zamora Alvarez
*Assistant Examiner* — Theodore C Ribadeneyra
(74) *Attorney, Agent, or Firm* — Barnes & Thornburg LLP

(57) ABSTRACT

A fan case assembly adapted for use with a gas turbine engine includes a case at extends circumferentially at least partway about an axis of the gas turbine engine and a plurality of vanes. The case is formed to define a channel that extends circumferentially at least partway about the axis. The plurality of vanes are arranged in the channel and spaced apart circumferentially about the axis.

20 Claims, 8 Drawing Sheets

(56) References Cited

U.S. PATENT DOCUMENTS

| | | |
|---|---|---|
| 8,257,022 B2 | 9/2012 | Guemmer |
| 8,419,355 B2 | 4/2013 | Guemmer et al. |
| 8,602,720 B2 | 12/2013 | Goswami et al. |
| 8,845,269 B2 | 9/2014 | Agneray et al. |
| 8,915,699 B2 | 12/2014 | Brignole et al. |
| 9,638,213 B2 | 5/2017 | Obrecht et al. |
| 9,651,060 B2 | 5/2017 | Morel et al. |
| 9,957,976 B2 | 5/2018 | Allford |
| 10,024,336 B2 | 7/2018 | Obrecht et al. |
| 10,047,620 B2 | 8/2018 | Giacche et al. |
| 10,378,550 B2 | 8/2019 | Lim et al. |
| 10,450,869 B2 | 10/2019 | Brignole et al. |
| 10,539,154 B2 | 1/2020 | Mallina et al. |
| 11,078,805 B2 | 8/2021 | Joly et al. |
| 11,092,030 B2 | 8/2021 | Joly et al. |
| 11,131,322 B2 | 9/2021 | Grothe et al. |
| 11,473,438 B2 | 10/2022 | Reynolds et al. |
| 11,572,897 B1 | 2/2023 | Duong et al. |
| 2007/0147989 A1 | 6/2007 | Collins |
| 2008/0044273 A1 | 2/2008 | Khalid |
| 2012/0315131 A1 | 12/2012 | Mertens |

FOREIGN PATENT DOCUMENTS

| | | |
|---|---|---|
| EP | 2434164 | 3/2012 |
| EP | 3081779 | 10/2016 |
| JP | 2003227497 A | 8/2003 |
| KR | 200930757 A | 3/2009 |

ADJUSTABLE DEPTH TIP TREATMENT WITH ROTATABLE RING WITH POCKETS FOR A FAN OF A GAS TURBINE ENGINE

STATEMENT REGARDING FEDERALLY SPONSORED RESEARCH OR DEVELOPMENT

Embodiments of the present disclosure were made with government support under Contract No. FA8650-19-D-2063 or FA8650-19-F-2078. The government may have certain rights.

FIELD OF THE DISCLOSURE

The present disclosure relates generally to gas turbine engines, and more specifically to fan assemblies for gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

In embedded gas turbine engine applications, the engine may experience high distortion in the form of pressure gradients and swirl. The pressure and swirl distortions may cause engine stall or other undesirable aeromechanical behavior. The fan of the gas turbine engine may include mitigation systems to reduce or minimize the negative effects of pressure and swirl distortions to improve stall margin of the engine.

SUMMARY

The present disclosure may comprise one or more of the following features and combinations thereof.

A fan case assembly may be adapted for use with a gas turbine engine. The fan case assembly may include a case, a plurality of vanes, and an inlet distortion mitigation system.

In some embodiments, the case may extend circumferentially at least partway about an axis to define an outer boundary of a gas path of the gas turbine engine. The case may be formed to define a channel. The channel may extend circumferentially at least partway about the axis.

In some embodiments, the plurality of vanes may be arranged in the channel. The vanes may be spaced apart circumferentially about the axis to define a plurality of openings open to the gas path of the gas turbine engine.

In some embodiments, the inlet distortion mitigation system may include a movable band and a control unit. The movable band may be arranged in the channel radially outward of the plurality of vanes. The movable band may be mounted for movement relative to the case.

In some embodiments, the movable band may be configured to rotate about the axis relative to the case to move between a first slot position and a second slot position. In the first slot position, the movable band may cooperate with the plurality of vanes to define a first set of slots having a first slot depth. In the second slot position, the movable band may cooperate with the plurality of vanes to define a second set of slots having a second slot depth. The second slot depth may be greater than the first slot depth.

In some embodiments, the control unit may be configured to move the movable band between the first slot position and the second slot position. The control unit may be configured to move the movable band between the first and second slot positions in response to preselected operating conditions to minimize negative effects pressure and swirl distortions in the gas turbine engine to improve stall margin.

In some embodiments, the movable band may be shaped to define a first set of pockets. The first set of pockets may extend radially to a first pocket depth. The first set of pockets may align with the plurality of openings to define the first set of slots when the movable band is in the first slot position.

In some embodiments, the movable band may be shaped to define a second set of pockets circumferentially between the first set of pockets. The second set of pockets may extend radially to a second pocket depth. The second set of pockets may align with the plurality of openings to define the second set of slots when the movable band is in the second slot position. In some embodiments, the second pocket depth of the second set of pockets may be greater than the first pocket depth of the first set of pockets.

In some embodiments, the inlet distortion mitigation system may further include a movable closure. The movable closure may be mounted for movement relative to the case and configured to rotate about the axis relative to the case to move between a closed position and an open position. In the closed position, the movable closure may cover the plurality of openings to block fluid communication between the gas path and one of the first set of pockets and the second set of pockets. In the open position, a plurality of apertures in the movable closure may be aligned with the plurality of openings to allow fluid communication between the gas path and the one of the first set of pockets and the second set of pockets. The control unit may be configured to move the movable closure between the closed position and the open position in response to the preselected operating conditions.

In some embodiments, the movable band may cooperate with the plurality of vanes to define a third set of slots. The third set of slots may have a third slot depth. The control unit may be configured to move the movable band between the first slot position, the second slot position, and the third slot position in response to the preselected operating conditions.

In some embodiments, the inlet distortion mitigation system may further include a movable closure. The movable closure may be mounted for movement relative to the case. The movable closure may be configured to rotate about the axis relative to the case to move between a closed position in which the movable closure covers the plurality of openings to block fluid communication between the gas path and one of the first set of pockets and the second set of pockets and an open position in which a plurality of apertures in the movable closure are aligned with the plurality of openings to allow fluid communication between the gas path and the one of the first set of pockets and the second set of pockets. The control unit may be configured to move the movable closure between the closed position and the open position in response to the preselected operating conditions.

In some embodiments, the control unit may include at least one actuator and a controller. The at least one actuator may be coupled to the movable band and configured to drive rotation of the movable band. The controller may be coupled to the at least one actuator and configured to direct the at least one actuator to rotate the movable band to the first slot position when the gas turbine engine is in a cruise condition included in the preselected operating conditions.

In some embodiments, the control unit may further include a memory coupled to the controller. The memory may include a plurality of preprogrammed aircraft maneuvers that each correspond to one of the first slot position and the second slot position.

In some embodiments, the controller may be configured to detect a preprogrammed aircraft maneuver included in the plurality of preprogrammed aircraft maneuvers on the memory. The controller may be configured to direct the at least one actuator to move the movable band to a corresponding position in response to detecting the preprogrammed aircraft maneuver.

In some embodiments, the control unit may further include at least one sensor coupled to the controller. The sensor may be configured to measure one of pressure, air speed, altitude, blade tip timing, blade rotational speed, attitude, and acceleration.

In some embodiments, the controller may be configured to receive a measurement from the at least one sensor. The controller may be configured to direct the at least one actuator to move the movable band to a corresponding position in response to the measurement of the at least one sensor.

According to another aspect of the present disclosure, a gas turbine engine may include a fan and a fan case assembly. The fan may include fan rotor and a plurality of fan blades. The fan rotor may be configured to rotate about an axis of the gas turbine engine. The plurality of fan blades may be coupled to the fan rotor for rotation therewith. The fan case assembly may extend circumferentially around the plurality of fan blades radially outward of the plurality of the fan blades.

In some embodiments, the fan case assembly may include a case, a plurality of vanes, and an inlet distortion mitigation system. The case may extend circumferentially at least partway about the axis. The case may be formed to define a channel that extends circumferentially at least partway about the axis.

In some embodiments, the plurality of vanes may be arranged in the channel. The plurality of vanes may be spaced apart circumferentially about the axis to define a plurality of openings open to a gas path of the gas turbine engine.

In some embodiments, the inlet distortion mitigation system may include a movable band and a control unit. The movable band may be arranged in the channel radially outward of the plurality of vanes. The movable band may be mounted for movement relative to the case.

In some embodiments, the movable band may be configured to rotate about the axis relative to the case to move between a first slot position and a second slot position. In the first slot position, the movable band may cooperate with the plurality of vanes to define a first set of slots having a first slot depth. In the second slot position, the movable band may cooperate with the plurality of vanes to define a second set of slots having a second slot depth that is different than the first slot depth. The control unit may be configured to move the movable band between the first slot position and the second slot position in response to preselected operating conditions.

In some embodiments, the movable band may be shaped to define a first set of pockets. The first set of pockets may extend radially to a first pocket depth. The first set of pockets may align with the plurality of openings to define the first set of slots when the movable band is in the first slot position.

In some embodiments, the movable band may be shaped to define a second set of pockets circumferentially between the first set of pockets. The second set of pockets may extend radially to a second pocket depth. The second set of pockets may align with the plurality of openings to define the second set of slots when the movable band is in the second slot position. The second pocket depth of the second set of pockets may be greater than the first pocket depth of the first set of pockets.

In some embodiments, the movable band may cooperate with the plurality of vanes to define a third set of slots. The third set of slots may have a third slot depth. The control unit may be configured to move the movable band between the first slot position, the second slot position, and the third slot position in response to the preselected operating conditions.

In some embodiments, the inlet distortion mitigation system may further include a movable closure mounted for movement relative to the case. The movable closure may be configured to rotate about the axis relative to the case to move between a closed position in which the movable closure covers the plurality of openings to block fluid communication between the gas path and one of the first set of pockets and the second set of pockets and an open position in which a plurality of apertures in the movable closure are aligned with the plurality of openings to allow fluid communication between the gas path and the one of the first set of pockets and the second set of pockets. The control unit may be configured to move the movable closure between the closed position and the open position in response to the preselected operating conditions.

In some embodiments, the control unit may include at least one actuator and a controller. The actuator may be coupled to the movable band and configured to drive rotation of the movable band. The controller may be coupled to the at least one actuator. The controller may be configured to direct the at least one actuator to rotate the movable band to the closed position when the gas turbine engine is in a cruise condition included in the preselected operating conditions.

In some embodiments, the control unit may further include a memory coupled to the controller. The memory may include a plurality of preprogrammed aircraft maneuvers that each correspond to one of the first slot position and the second slot position.

In some embodiments, the controller may be configured to detect a preprogrammed aircraft maneuver included in the plurality of preprogrammed aircraft maneuvers on the memory. The controller may be configured to direct the at least one actuator to move the movable band to a corresponding position in response to detecting the preprogrammed aircraft maneuver.

In some embodiments, the control unit may further include at least one sensor coupled to the controller. The sensor may be configured to measure one of pressure, air speed, altitude, blade tip timing, blade rotational speed, attitude, and acceleration. The controller may be configured to receive a measurement from the at least one sensor and direct the at least one actuator to move the movable band to a corresponding position in response to the measurement of the at least one sensor.

According to another aspect of the present disclosure, a method may include providing a fan case assembly adapted for use with a gas turbine engine. The fan case assembly may include a case, a plurality of vanes, and an inlet distortion mitigation system.

In some embodiments, the case may extend circumferentially at least partway about an axis of the gas turbine engine. The case may be formed to define a channel that extends circumferentially at least partway about the axis. The plurality of vanes may be arranged in the channel and spaced apart circumferentially about the axis to define a plurality of inlet openings open to a gas path of the gas turbine engine. The inlet distortion mitigation system may include a movable band mounted for rotation about the axis relative to the case.

In some embodiments, the method may further include locating the movable band in a first slot position. In the first slot position, the movable band may cooperate with the plurality of vanes to define a first set of slots having a first slot depth.

In some embodiments, the method may further include rotating the movable band from the first slot position to a second slot position. In the second slot position, the movable band may cooperate with the plurality of vanes to define a second set of slots having a second slot depth. The second slot depth may be greater than the first slot depth in response to one preselected operating condition included in a plurality of preselected operating conditions.

In some embodiments, the inlet distortion mitigation system may further include a movable closure. The movable closure may be mounted for rotation about the axis relative to the case.

In some embodiments, the method may further include locating the movable closure in a closed position. In the closed position, the movable closure may cover the plurality of openings to block fluid communication between the gas path and one of the first set of slots and the second set of slots.

In some embodiments, the method may further include rotating the movable closure from the closed position to an open position. In the open position, a plurality of apertures in the movable closure may be aligned with the plurality of openings to allow fluid communication between the gas path and the one of the first set of slots and the second set of slots.

These and other features of the present disclosure will become more apparent from the following description of the illustrative embodiments.

DETAILED DESCRIPTION OF THE DRAWINGS

Figure 1:
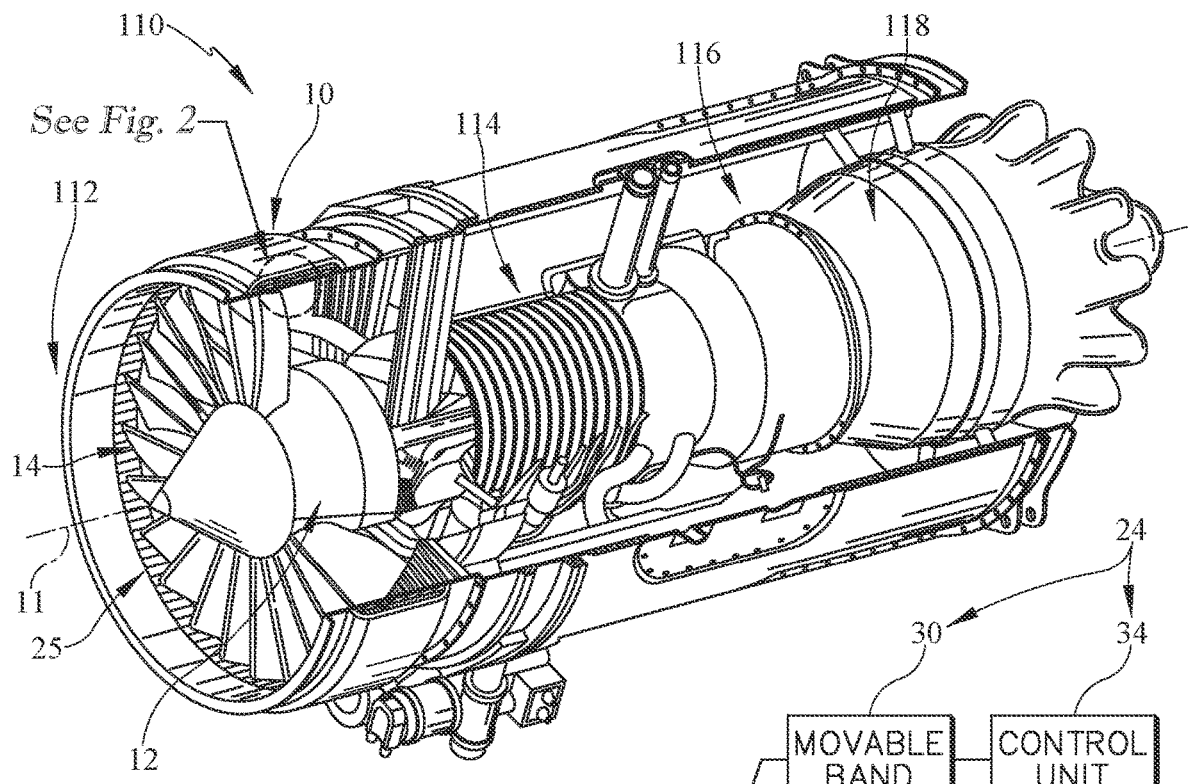
FIG. 1 is a cutaway view of a gas turbine engine that includes a fan, a compressor, a combustor, and a turbine, the fan including fan rotor configured to rotate about an axis of the engine and a fan case assembly that surrounds fan blades included in the fan rotor.

For the purposes of promoting an understanding of the principles of the disclosure, reference will now be made to a number of illustrative embodiments illustrated in the drawings and specific language will be used to describe the same.

A fan case assembly 10 is adapted for use in a gas turbine engine 110 as shown in FIG. 1. The gas turbine engine 110 includes a fan 112, a compressor 114, a combustor 116, and a turbine 118 as shown in FIG. 1. The fan 112 is driven by the turbine 118 and provides thrust for propelling an aircraft. The compressor 114 compresses and delivers air to the combustor 116. The combustor 116 mixes fuel with the compressed air received from the compressor 114 and ignites the fuel. The hot, high pressure products of the combustion reaction in the combustor 116 are directed into the turbine 118 to cause the turbine 118 to rotate about an axis 11 of the gas turbine engine 110 and drive the compressor 114 and the fan 112.

The fan 112 includes a fan rotor 12 and a fan case assembly 10 as shown in FIG. 1. The fan rotor 12 has a number of fan blades 14. The fan case assembly 10 extends circumferentially around the fan blades 14 of the fan rotor 12 such that the fan case assembly 10 is aligned axially with the fan blades 14.

Figure 2:
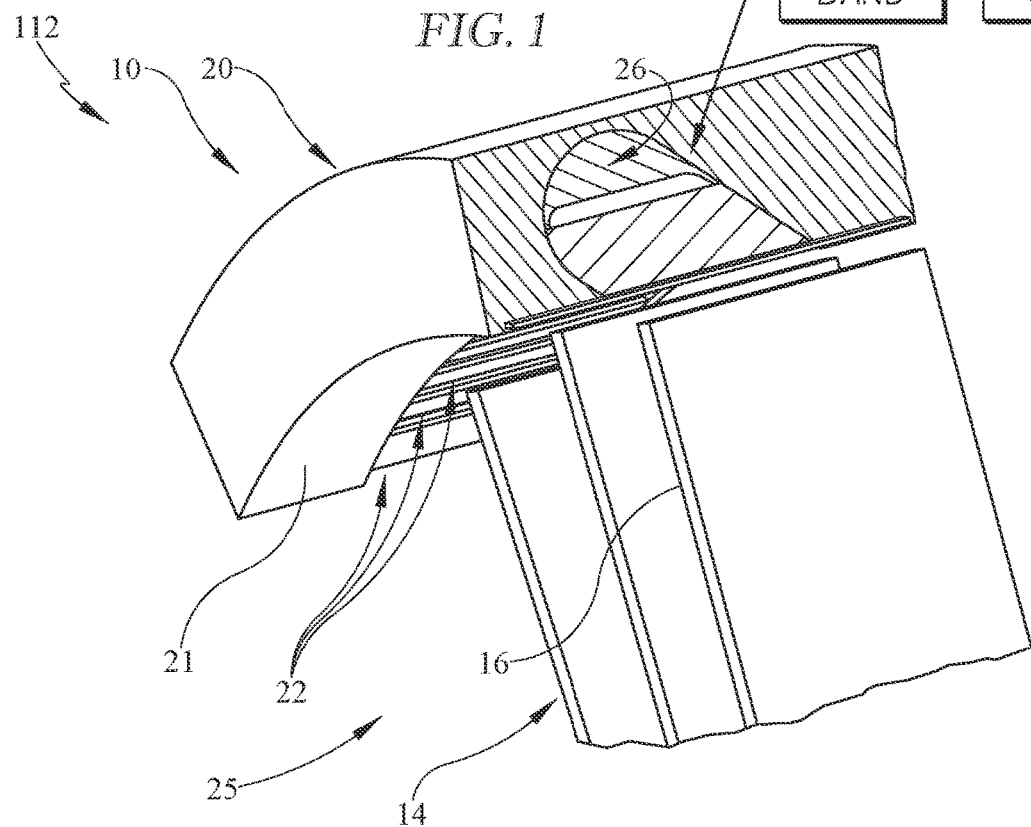
FIG. 2 is a detail view of the fan case assembly included in the gas turbine engine of FIG. 1 showing that the fan case assembly includes a case that extends circumferentially at least partway about an axis of the engine radially outward of the fan blades to define an outer boundary of a gas path of the gas turbine engine, a plurality of a plurality of vanes arranged in a channel defined by the case to form a plurality of openings open to the gas path, and an inlet distortion mitigation system that includes a movable band mounted for rotation about the axis relative to the case between a first slot position as shown in FIG. 5A and a second slot position as shown in FIG. 6A and a control unit configured to move the movable band between the different positions in response to preselected operating conditions to control the depth of the slots located between the plurality of vanes so as to minimize the negative effects of pressure and swirl distortions in the gas turbine engine to improve stall margin.
Figure 3:
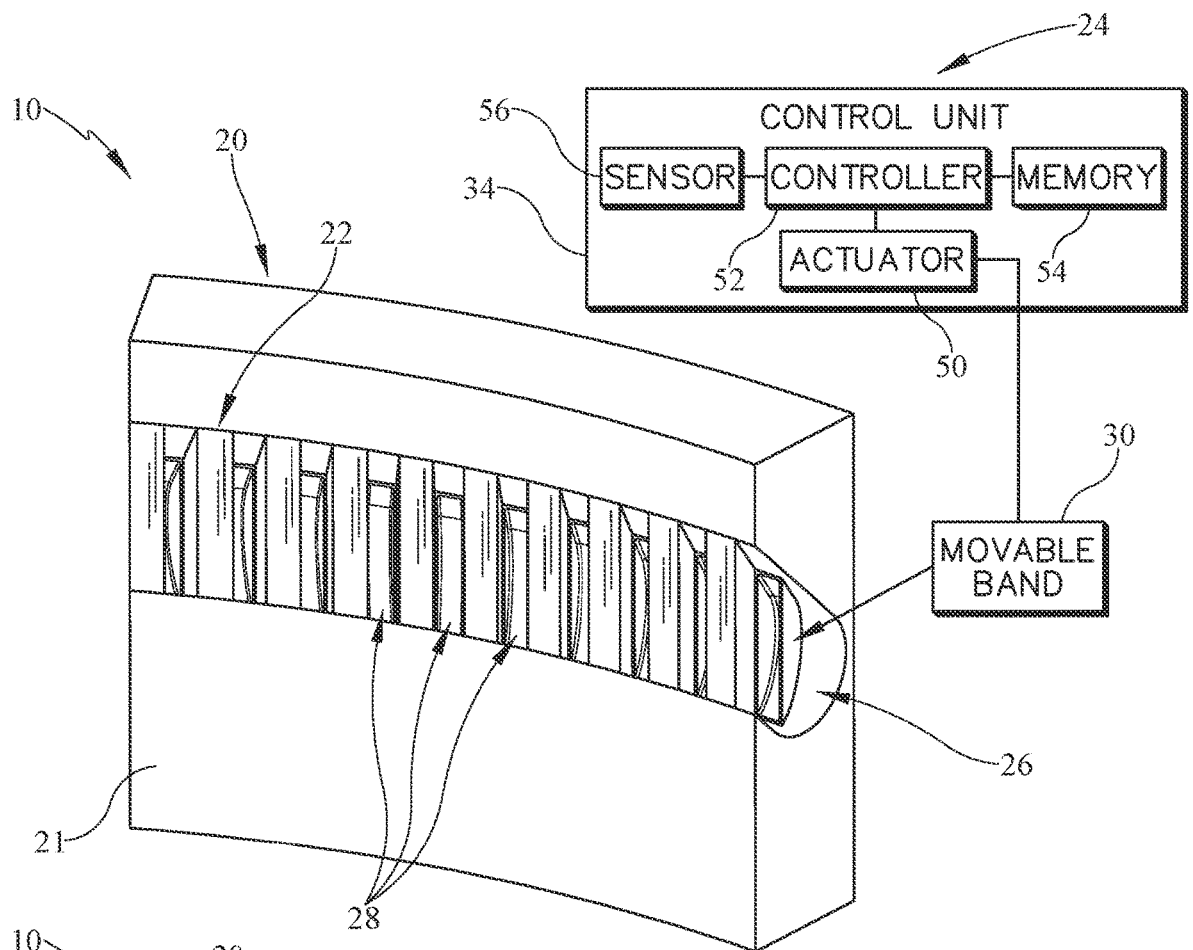
FIG. 3 is a perspective view of the fan case assembly of FIG. 2 showing the movable band is located in the channel radially outward of the plurality of vanes.
Figure 4:
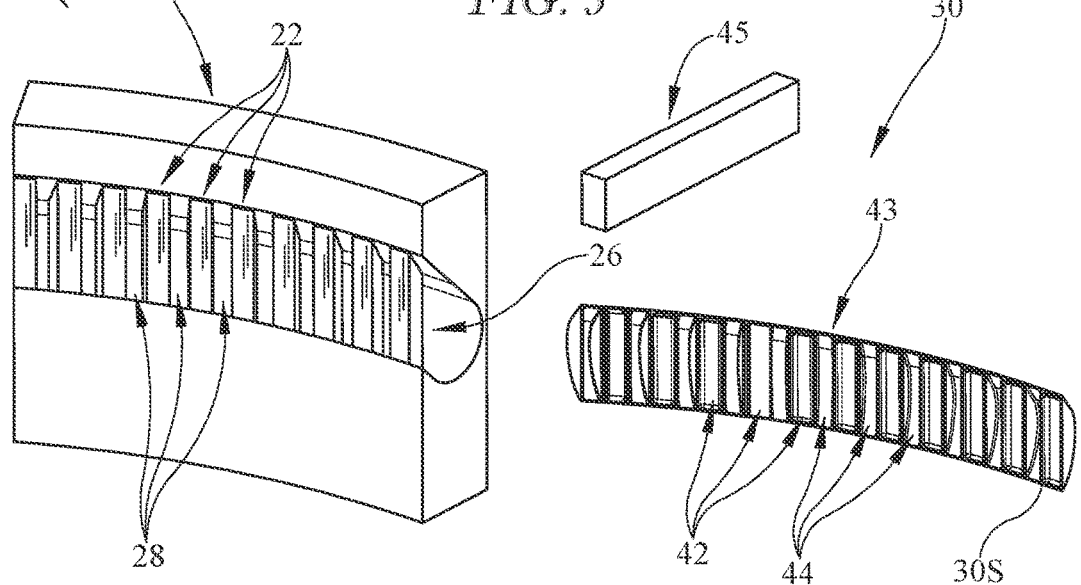
FIG. 4 is an exploded view of the fan case assembly of FIG. 3 showing the movable band is shaped to include a first set of pockets and a second set of pockets circumferentially between the first set of pockets.

The fan case assembly 10 includes, among other components, a case 20, a plurality of vanes 22, and an inlet distortion mitigation system 24 as shown in FIGS. 2-4. The case 20 extends circumferentially at least partway about the axis 11 to define an outer boundary of a gas path 25 of the gas turbine engine 110. The case 20 is formed to define a channel 26 that extends circumferentially at least partway about the axis 11 and is open to the gas path 25 of the gas turbine engine 110. The plurality of vanes 22 are arranged in the channel 26. The plurality of vanes 22 are spaced apart circumferentially about the axis 11 to define a plurality of openings 28 in fluid communication with the channel 26. The inlet distortion mitigation system 24 is configured to control the depth of slots formed between the plurality of vanes 22.

Figure 5A:
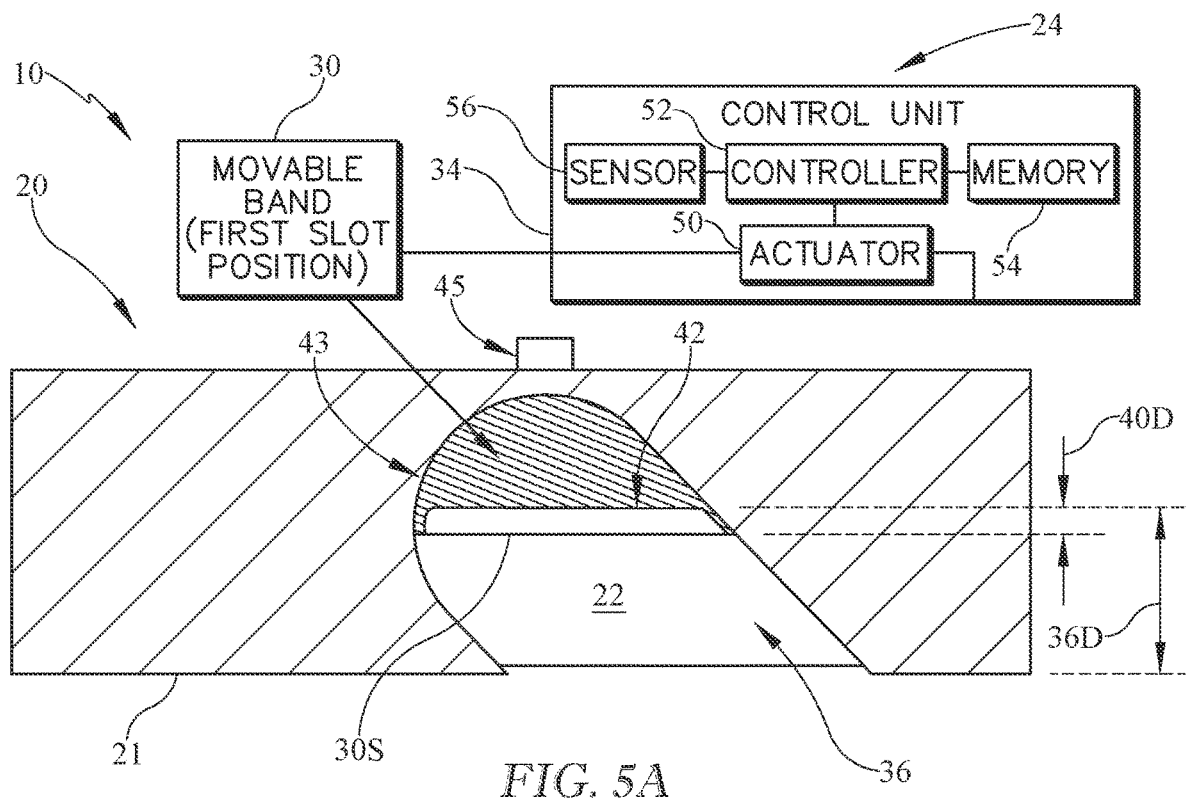
FIG. 5A is a cross-section view of the fan case assembly of FIG. 3 in the first slot position in which the first set of pockets align with the plurality of openings to define a first set of slots having a first slot depth and the second set of pockets align with the plurality of vanes.
Figure 6A:
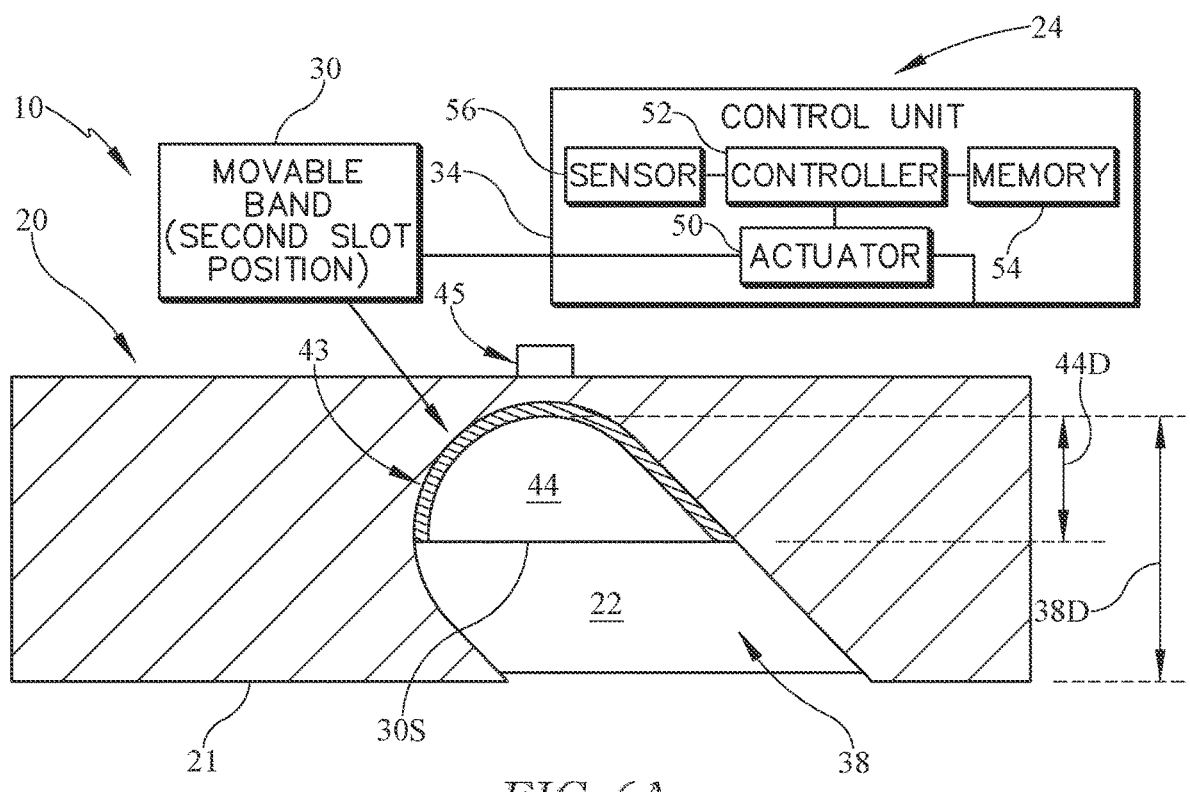
FIG. 6A is a cross-section view of the fan case assembly of FIG. 3 in the second slot position in which the second set of pockets align with the plurality of openings to define a second set of slots having a second slot depth that is greater than the first slot depth and the first set of pockets align with the plurality of vanes.
Figure 5B:
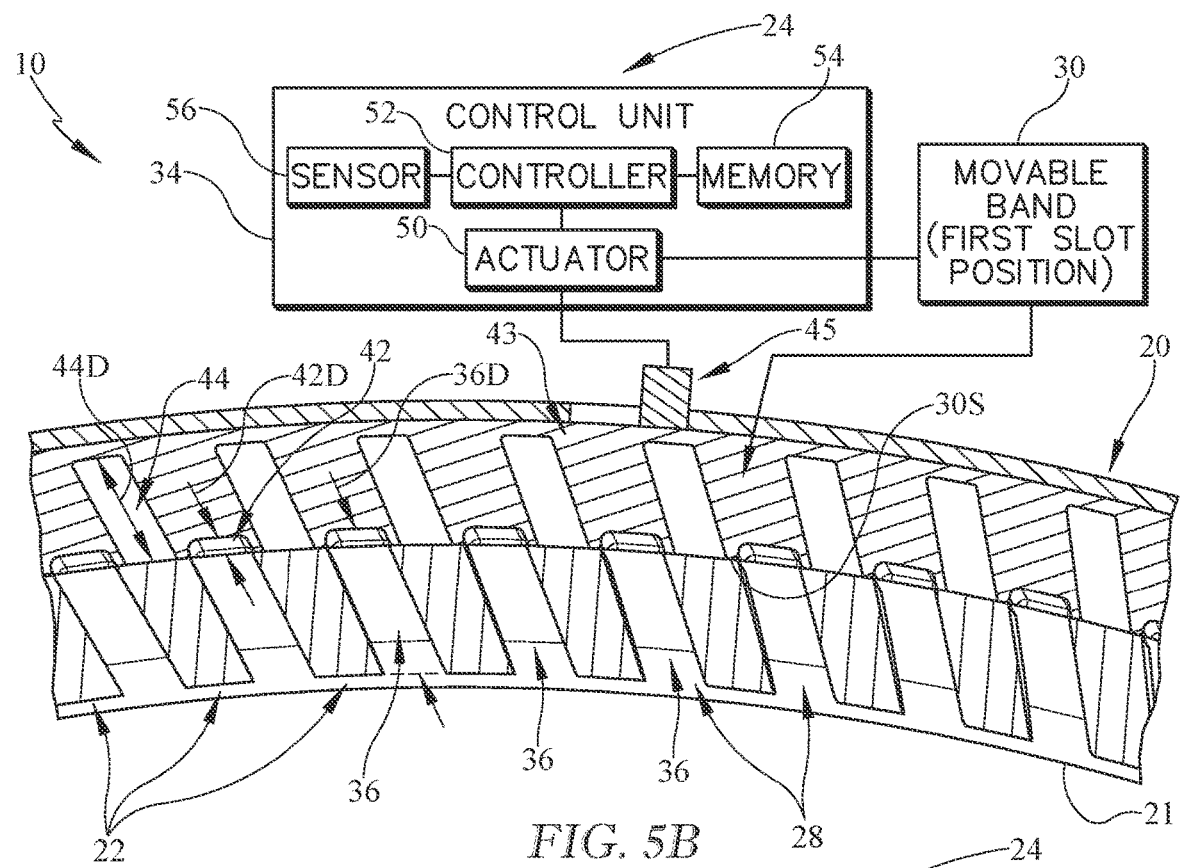
FIG. 5B is a cross-section view of the fan case assembly of FIG. 5A showing the first set of pockets extend radially to a first pocket depth.
Figure 6B:
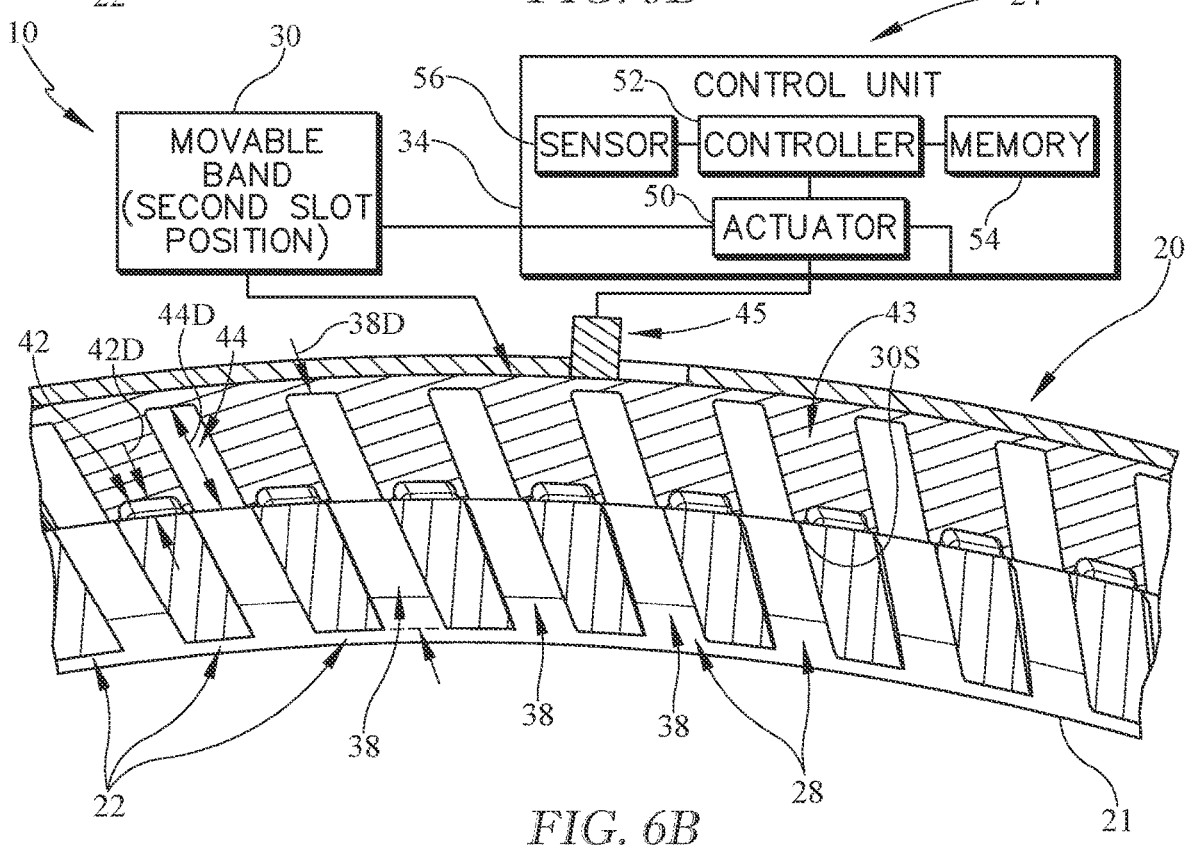
FIG. 6B is a cross-section view of the fan case assembly of FIG. 6A showing the second set of pockets extend radially to a second pocket depth that is greater than the first pocket depth.

The inlet distortion mitigation system 24 includes a movable band 30 and a control unit 34 as shown in FIGS. 2-4. The movable band 30 is mounted for rotation about the axis 11 relative to the case 20 between a first slot position as shown in FIGS. 5A and 5B and a second slot position as shown in FIGS. 6A and 6B. The control unit 34 is configured to rotate the movable band 30 between the different positions in response to preselected operating conditions to control the depth of slots formed between the plurality of vanes 22 so as to minimize the negative effects of pressure and swirl distortions in the gas turbine engine 110 to improve stall margin for the gas turbine engine 110.

Embedded engines on an aircraft may experience high distortion in the form of pressure gradients and swirl. The pressure and swirl distortions may cause engine stall or other undesirable aeromechanical behavior. Additionally, there may be points during a mission or moments with maneuvers where it may be desirable to incorporate a different available stall margin available. Attempting to solve the worst stall condition while maintaining performance over all of the cycles or flight conditions may be difficult and result in compromised efficiency or a limited flight envelope.

Therefore, the fan case assembly 10 includes the inlet distortion mitigation system 24 which includes the movable band 30 that rotates about the axis 11 relative to the case 20 to control the depth of the slots located between the plurality of vanes 22. In this way, the negatives effects of pressure and swirl distortions are minimized to improve stall margin. The negative effects may include loss of efficiency or overall performance of the engine 110 and/or other negative operating conditions known to one of ordinary skill in the art.

In the first slot position, the movable band 30 cooperates with the plurality of vanes 22 to define a first set of slots 36 having a first slot depth 36D as shown in FIG. 5B. In the second slot position, the movable band 30 cooperates with the plurality of vanes 22 to define a second set of slots 38 having a second slot depth 38D as shown in FIG. 6B. The second slot depth 38D is greater than the first slot depth 36D.

The control unit 34 is configured to move the movable band 30 between the first slot position and the second slot position in response to preselected operating conditions. The preselected operating conditions include a plurality of preprogrammed aircraft maneuvers stored on a memory 54 included in the control unit 34. The plurality of preprogrammed aircraft maneuvers include banks, turns, rolls, etc.

The control unit 34 is configured to detect a preprogrammed aircraft maneuver included in the plurality of preprogrammed aircraft maneuvers on the memory 54. Once the preprogrammed aircraft maneuver is detected, the control unit 34 directs the movable band to move to one of the first slot position and the second slot position in response to detecting the preprogrammed aircraft maneuver.

For example, the movable band 30 may normally be in the first slot position during cruise so that minimal additional stall margin is created, but performance is not compromised. The cruise condition included in the preselected operating conditions corresponds when the aircraft is in the cruise portion of the flight cycle.

Then, when the control unit 34 detects a preprogrammed aircraft maneuver, i.e. banks, turns, rolls, the control unit 34 directs the movable band 30 to rotate about the axis 11 to the second slot position so that the second set of slots 38 are formed. This allows for more radial and some forward flow compared to the first set of slots 36.

Conversely, when the control unit 34 detects the cruise condition after a preprogrammed aircraft maneuver, the control unit 34 directs the movable band 30 to move to the first slot position. Therefore, once the aircraft maneuver is completed, the movable band 30 moves to the first slot position so that performance is not compromised and the additional stall margin is removed during the cruise condition.

The preselected operating conditions may further include a sensor input from at least one sensor 56 included in the control unit 34. The sensor 56 is configured to measure one of pressure, air speed, and acceleration. The sensor 56 is also configured to detect distortion, fan stall, and/or other aeromechanical issues. In some embodiments, the control unit 34 includes a plurality of sensors 56 each configured to measure one of pressure, air speed, and acceleration and/or detect distortion, fan stall, and/or other aeromechanical issues.

The sensor 56 may include one of or a combination of dynamic sensors, static wall pressure sensors, altitude sensors, sensors configured to detect the angle of attack of the plurality of fan blades 14, sensors configured to detect the tip timing of the plurality of fan blades 14, and air speed sensors. In some embodiments, the sensor 56 may be a dynamic pressure transducer. The sensor 56 may also be a sensor configured to measure a rotational speed of the fan blades 14, which could be used along with an additional sensor that is a dynamic pressure transducer. In some embodiments, the sensor 56 may be a sensor configured to measure a rotation speed of another section of the engine 110.

The preselected operating conditions may further include a sensor input from the sensor 56 or sensors 56 included in the control unit 34. The sensor 56 is configured to measure one of pressure, air speed, altitude, blade tip timing, blade rotational speed, attitude or aircraft orientation, and acceleration.

The control unit 34 is configured to receive a measurement from the at least one sensor 56 or sensors 56 and direct the movable band 30 to move to a corresponding position in response to the measurement of the at least one sensor 56. The control unit 34 may be configured to direct the movable band 30 to be in the first slot position when the measurements from the sensor 56 are within a predetermined threshold.

Then, when the measurement from the sensor 56 is outside of the predetermined threshold, the control unit 34 directs the movable band 30 to move to the second slot position. Based on the difference of the measurement from the sensor 56 compared to the predetermined threshold, the control unit 34 may change the position of the movable band 30 to control the depth of the slots 36, 38.

In some embodiments, the control unit 34 may be configured to use a combination of the sensor measurements and the detected preprogrammed aircraft maneuver to control the position of the movable band 30. For example, when the control unit 34 detects a preprogrammed aircraft maneuver and the measurement is outside of the predetermined threshold, the control unit 34 directs the movable band 30 rotate to the second slot position.

In some embodiments, the control unit 34 is configured to use the measurements from the sensor 56 to anticipate the aircraft maneuver. The control unit 34 is configured to direct the movable band 30 to move to the second slot position in response to the measurement from the sensor 56 even though no preprogrammed aircraft maneuver is detected.

Alternatively, there may be a delay in the measurements from the sensor 56. Therefore, the control unit 34 is also configured to direct the movable band 30 to move to the second slot position when the one of the preprogrammed aircraft maneuvers is detected, even though the measurements from the sensor 56 are within the predetermined thresholds.

In some embodiments, the control unit 34 may detect one of the preprogrammed aircraft maneuvers, but the measurements from the sensors 56 are within the predetermined threshold. If so, the control unit 34 may direct the movable band 30 to remain in the current position.

The movable band 30 is shaped to define a first set of pockets 42 and a second set of pockets 44 as shown in FIGS. 2-4. Each pocket 44 of the second set of pockets 44 are arranged circumferentially between adjacent pockets 42 of the first set of pockets 42.

The first set of pockets 42 align with the plurality of openings 28 to define the first set of slots 36 when the movable band 30 is in the first slot position. The second set of pockets 44 align with the plurality of openings 28 to define the second set of slots 38 when the movable band 30 is in the second slot position.

The first set of pockets 42 extend radially into an inner surface 30S of the movable band 30 as shown in FIG. 5B. The first set of pockets 42 extend radially into the inner surface 30S to a first pocket depth 42D.

The second set of pockets 44 extend radially into the inner surface 30S of the movable band 30 as shown in FIG. 6B. The second set of pockets 44 extend radially into the inner surface 30S to a second pocket depth 44D.

Turning again to the fan case assembly 10, the fan case assembly 10 extends circumferentially at least partway about the axis 11 in the illustrative embodiment. In some embodiments, the fan 112 may include multiple fan case assemblies 10 arranged circumferentially about the axis 11 to form a full hoop. In other embodiments, the fan case assembly 10 may be annular and extends circumferentially about the axis 11. In some embodiments, the case 20 may extend around the axis 11, while the channel 26 only extends partway about the axis 11.

In some embodiments, the fan 112 may include multiple fan case assemblies 10 spaced apart circumferentially about the axis 11 to define segments between each fan case assembly 10. The segments between the fan case assemblies 10 does not have a channel 26.

In some embodiments, the case 20 is a split case. The case 20 includes sections that are coupled to together to trap the movable band 30 in the channel 26 radially outward of the vanes 22.

The case 20 is formed to define the channel 26 that extends circumferentially at least partway about the axis 11 as shown in FIGS. 2-4. The plurality of vanes 22 are arranged in the channel 26 to define the plurality of openings 28 in fluid communication with the channel 26.

The channel 26 is formed in the case 20 so that the channel 26 is located at a leading edge 16 of each of the fan blades 14 as shown in FIG. 2. In the illustrative embodiment, the channel 26 has a forward leaning cross-sectional shape, as shown in FIGS. 2-4. In other embodiments, the channel 26 may have another cross-sectional shape.

Each of the vanes 22 extends axially across the channel 26 as shown in FIGS. 2-4. In the illustrative embodiment, the vanes 22 are tilted circumferentially relative to the axis 11. Each of the first and second sets of pockets 42, 44 also extend radially and circumferentially into the movable band 30.

In the illustrative embodiment, the plurality of vanes 22 only extend axially across the channel 26. Each of the pockets 42, 44 only extend axially to align with the openings 28 between each of the vanes 22.

In other embodiments, the plurality of vanes 22 extend axially and circumferentially across the channel 26. In such embodiments, the pockets 42, 44 extend axially and circumferentially across the channel 26 to align with the openings 28 defined between the adjacent vanes 22.

The inlet distortion mitigation system 24 includes the movable band 30 and the control unit 34 as shown in FIGS. 2-4. The movable band 30 includes the first set of pockets 42 and the second set of pockets 44 that are alternated between each other about the axis 11.

In the illustrative embodiment, the second set of pockets 44 each has a cross-sectional shape that matches a cross-sectional shape of a portion of the channel 26 when viewed in the circumferential direction as shown in FIGS. 5B and 6B. Each pocket 44 has a forward leaning cross-sectional shape in the illustrative embodiment. In some embodiments, the cross-section shape of the pockets 44 may be a different shape compared to the cross-sectional shape of the channel 26. The first set of pockets 42 have a different cross-sectional shape than the second set of pockets 44 in the illustrative embodiment.

In the illustrative embodiment, the movable band 30 includes the first set of pockets 42 that cooperate with the plurality of vanes 22 to form the first set of slots 36 and the second set of pockets 44 that cooperate with the plurality of vanes 22 to form the second set of slots 38. In other embodiments, the movable band 30 only includes one set of pockets, while the inner surface 30S of the movable band 30 cooperates with the plurality of vanes 22 to define the first set of slots 36.

In other words, in the first slot position, the inner surface 30S of the movable band 30 forms part of each slot 36. In the second slot position, one set of pockets 42, 44 cooperates with the vanes 22 to form the second set of slots 38 that have a greater slot depth than the first set of slots 36.

In the illustrative embodiment, the movable band 30 further includes a band body 43 and a rod 45 as shown in FIGS. 5A, 6A, and 7A. The rod 45 is coupled to the band body 43 of the movable band 30 and extends radially outward through the case 20 to be coupled an actuator 50 included in the control unit 34.

In some embodiments, the movable band 30 may include a rack and pinion assembly to drive rotation of the band body 43. Instead of extending through the case 20, the rod 45 may be contained in the case and function as a rack with teeth that mate with a corresponding gear. The gear may be coupled to the actuator 50 of the control unit 34 to drive rotation of the gear which in turn drives rotation of the band body 43.

In some embodiments, another suitable actuation assembly may be used. For example, the movable band 30 may include an actuation system similar to those used to control variable vanes. In some embodiments, the movable band 30 may include an actuation system similar to the one as described in U.S. Pat. No. 8,425,000, titled "VARIABLE VANE ACTUATION SYSTEM," which is hereby incorporated herein by reference in its entirety for its disclosure relative to the actuation system. The movable band 30 may include another suitable mechanical drive mechanism or linkage coupled to the band 40 to drive rotation of the band 40 about the axis 11.

The control unit 34 includes at least one actuator 50, a controller 52, a memory 54, and at least one sensor 56 as shown in FIGS. 2-4. The actuator 50 is coupled to the movable band 30. The actuator 50 is configured to drive rotation of the movable band 30. The controller 52 is coupled to the actuator 50 to direct the actuator 50 to rotate the movable band 30 between the different positions.

In some embodiments, the control unit 34 includes at least one actuator 50. In some embodiments, the actuator 50 may include pneumatic or electric actuators, or combinations of hydraulic, pneumatic, and electric. Any other actuator known to a person skilled in the art could be utilized as well. The actuator 50 is configured to drive rotation of the movable band 30 between the first slot position FIGS. 5A and 5B and the second slot position as shown in FIGS. 6A and 6B.

In the illustrative embodiment, the control unit 34 includes a single actuator 50 coupled to the rod 45 to drive rotation of the movable band 30. If the fan 112 includes multiple fan case assemblies 10 spaced apart around the axis 11, the control unit 34 may include multiple actuators 50 to control rotation of each movable band 30. Each actuator 50 may be coupled to the rod 45 included in the respective movable band 30.

The controller 52 is configured to direct the actuator 50 to move the movable band 30 between the different positions in response to preselected operating conditions. The preselected operating conditions include the plurality of preprogrammed aircraft maneuvers stored on the memory 54 included in the control unit 34.

The controller 52 of the control unit 34 is configured to detect a preprogrammed aircraft maneuver included in the plurality of preprogrammed aircraft maneuvers on the memory 54. Once the preprogrammed aircraft maneuver is detected, the controller 52 directs the actuator 50 to drive rotation of the movable band 30 to a corresponding position in response to detecting the preprogrammed aircraft maneuver.

The preselected operating conditions may further include a sensor input from the sensor 56 or sensors 56 included in the control unit 34. The sensor 56 is configured to measure one of pressure, air speed, and acceleration.

The controller 52 of the control unit 34 is configured to receive a measurement from the sensor 56 or sensors 56 and direct the actuator 50 to move the movable band 30 to a corresponding position in response to the measurement of the at least one sensor 56. The controller 52 of the control unit 34 may be configured to direct actuator 50 to move the movable band 30 to the closed position when the measurements from the sensor 56 are within a predetermined threshold.

Then, when the measurement from the sensor 56 is outside of the predetermined threshold, the controller 52 directs the actuator 50 to move the movable band 30 to the first slot position. Based on the difference of the measurement from the sensor 56 compared to the predetermined threshold, the controller 52 may change the position of the movable band 30 to control the depth of the slots 36, 38.

In some embodiments, the controller 52 of the control unit 34 may be configured to use a combination of the sensor measurements and the detected preprogrammed aircraft maneuver to control the position of the movable band 30. For example, when the controller 52 of the control unit 34 detects a preprogrammed aircraft maneuver and the measurement is outside of the predetermined threshold, the controller 52 directs the actuator 50 to rotate the movable band 30 to first slot position.

In some embodiments, the controller 52 of the control unit 34 is configured to use the measurements from the sensor 56 to anticipate the aircraft maneuver. The controller 52 of the control unit 34 is configured to direct the actuator 50 to move the movable band 30 to the first slot position in response to the measurement from the sensor 56 even though no preprogrammed aircraft maneuver is detected.

Alternatively, there may be a delay in the measurements from the sensor 56. Therefore, the controller 52 of the control unit 34 is also configured to direct the actuator 50 to move the movable band 30 to the first slot position when the one of the preprogrammed aircraft maneuvers is detected, even though the measurements from the sensor 56 are within the predetermined thresholds.

In some embodiments, the controller 52 of the control unit 34 may detect one of the preprogrammed aircraft maneuvers, but the measurements from the sensors 56 are within the predetermined threshold. If so, the controller 52 of the control unit 34 may direct the movable band 30 to remain in the current position.

A method of operating the inlet distortion mitigation system 24 may include several steps. During normal cruise conditions, the controller 52 directs the actuator 50 to locate the movable band 30 in the first slot position. If the controller 52 detects one of the preselected operating conditions other than the cruise condition, the controller 52 directs the actuator 50 to rotate the movable band 30 to the second slot position to minimize the negative effects of pressure and swirl distortions to improve stall margin.

The method further includes continually adjusting the position of the movable band 30 based on the preselected operating conditions of the engine 110. If the controller 52 detects the cruise condition, the controller 52 directs the actuator 50 to move the movable band 30 back to the first slot position. In other instances, the controller 52 may direct the actuator 50 to control the position of the movable band 30 as discussed above based on the preprogrammed aircraft maneuvers and/or the measurements from the sensors 56.

Figure 7:
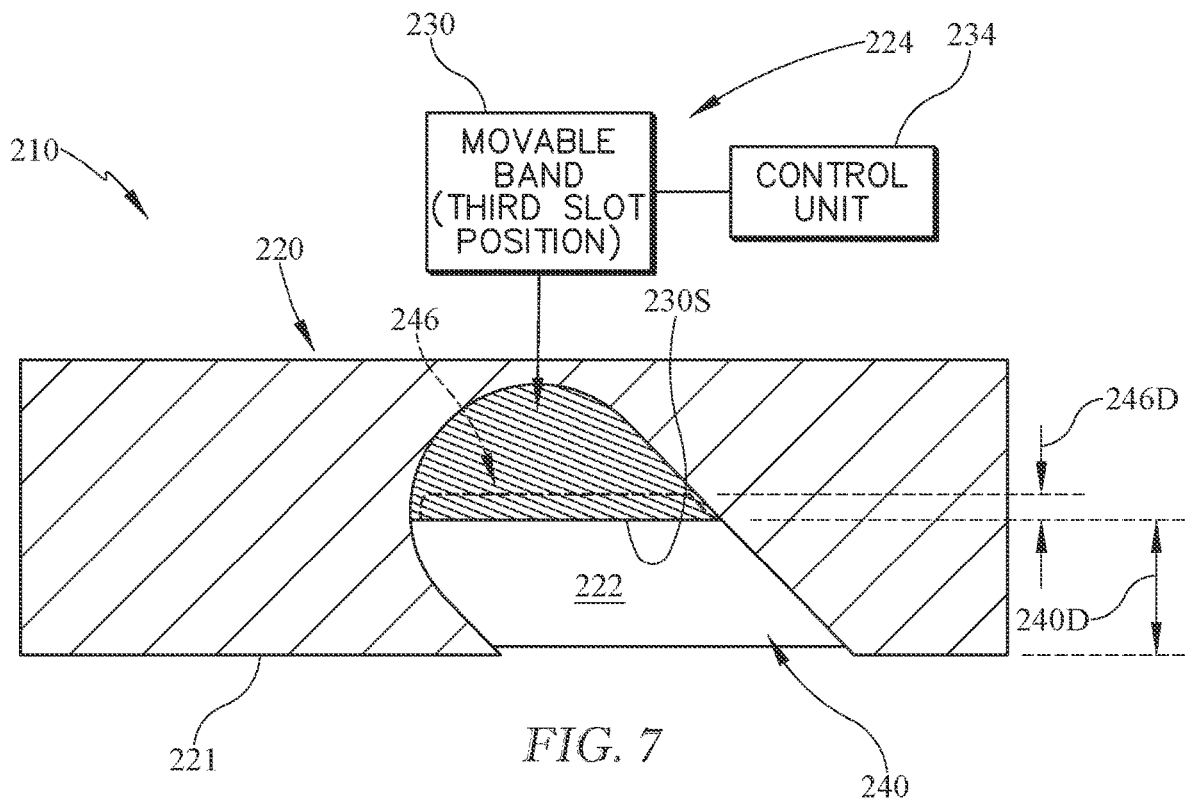
FIG. 7 is a cross-section view of another embodiment of a fan case assembly showing the fan case assembly includes a case that defines a channel, a plurality of a plurality of vanes arranged in the channel to form a plurality of openings open to the gas path, and an inlet distortion mitigation system that includes a movable band mounted for rotation about the axis relative to the case to control the depth of the slots between the plurality of vanes, and further showing an inner surface of the movable band may cooperate with the adjacent vanes to define a plurality of slots.
Figure 8:
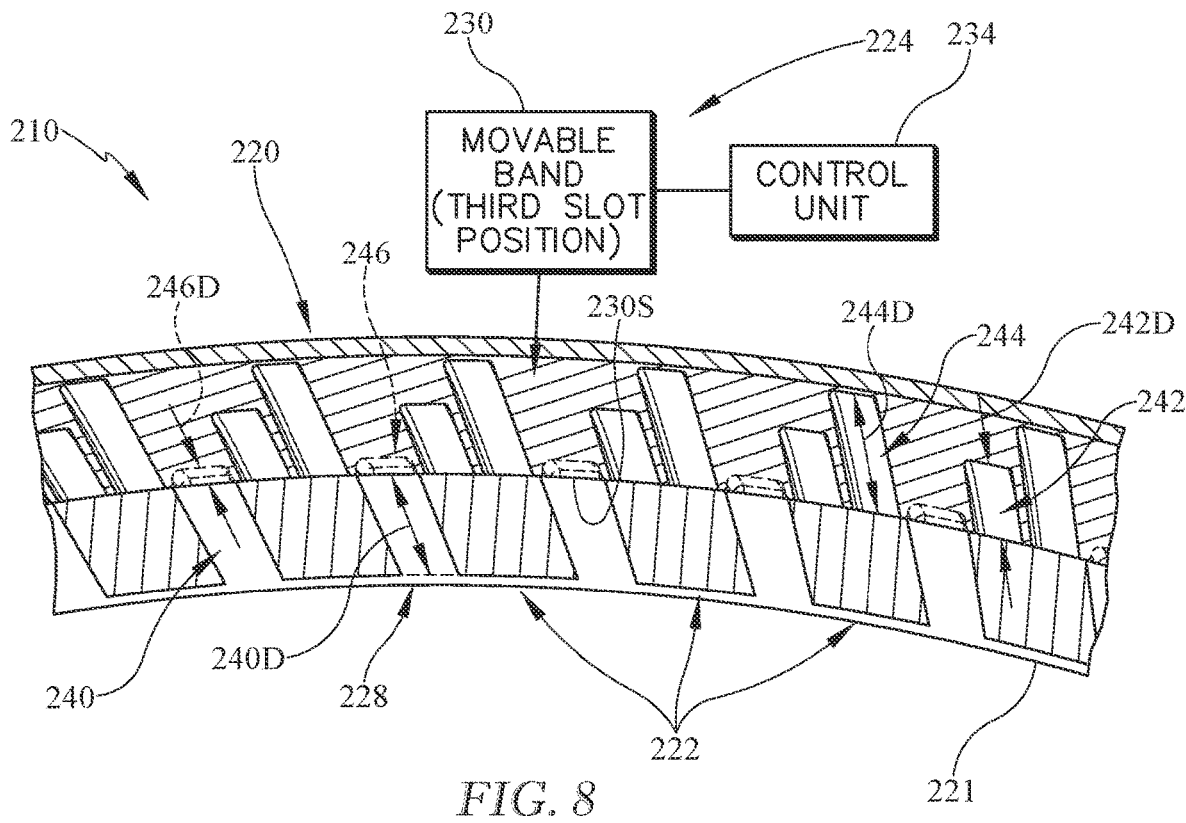
FIG. 8 is a cross-section view of the fan case assembly of FIG. 8 showing the movable band may further include a third set of pockets arranged in a repeating series pattern with the first set of pockets and the second set of pockets that align with the plurality of openings to define a third set of slots having a third slot depth different from the first and second slot depths.

Another embodiment of a fan case assembly 210 in accordance with the present disclosure is shown in FIGS. 7-8. The fan case assembly 210 is substantially similar to the fan case assembly 10 shown in FIGS. 1-6B and described herein. Accordingly, similar reference numbers in the 200 series indicate features that are common between the fan case assembly 10 and the fan case assembly 210. The description of the fan case assembly 10 is incorporated by reference to apply to the fan case assembly 210, except in instances when it conflicts with the specific description and the drawings of the fan case assembly 210.

The fan case assembly 210 includes, among other components, a case 220, a plurality of vanes 222, and an inlet distortion mitigation system 224 as shown in FIGS. 7 and 8. The case 220 extends circumferentially at least partway about the axis 11. The case 220 is formed to define a channel 226 that extends circumferentially at least partway about the axis 11. The plurality of vanes 222 are arranged in the channel 226. The plurality of vanes 222 are spaced apart circumferentially about the axis 11 to define a plurality of openings 228 in fluid communication with the channel 226. The inlet distortion mitigation system 224 is configured to control the depth of slots formed between the plurality of vanes 222.

The inlet distortion mitigation system 224 includes a movable band 230 and a control unit 234 as shown in FIGS. 7 and 8. The movable band 230 is mounted for rotation about the axis 11 relative to the case 220 between three different slot positions. The first slot position is similar to those shown in FIGS. 5A and 5B and the second slot position is similar to those shown in FIGS. 6A and 6B. The third slot position is shown in FIGS. 7 and 8.

In the first slot position, the movable band 230 cooperates with the plurality of vanes 222 to define a first set of slots having a first slot depth similar to the ones shown in FIGS. 5A and 5B. In the second slot position, the movable band 230 cooperates with the plurality of vanes 222 to define a second set of slots having a second slot depth similar to the ones shown in FIGS. 6A and 6B.

In the third slot position, the movable band 230 cooperates with the plurality of vanes 222 to define a third set of slots 240 have a third slot depth 240D as shown in FIGS. 7 and 8. The third slot depth 240D is less than the first and second slot depths in the illustrative embodiment.

In the illustrative embodiment, the third slot 240 is defined between the inner surface 230S of the movable band 230 and the adjacent vanes 222. In some embodiments, the movable band 230 may include another pocket that extends into the inner surface 230S of the movable band 230 and the third set of slots 240 is defined by the pocket and the adjacent vanes 222.

The control unit 234 is configured to move the movable band 230 between the first slot position, the second slot position, and the third slot position in response to preselected operating conditions. The preselected operating conditions include a plurality of preprogrammed aircraft maneuvers stored on a memory included in the control unit 234. The plurality of preprogrammed aircraft maneuvers include banks, turns, rolls, etc.

The control unit 234 is configured to detect a preprogrammed aircraft maneuver included in the plurality of preprogrammed aircraft maneuvers on the memory. Once the preprogrammed aircraft maneuver is detected, the control unit 234 directs the movable band to move to one of the first slot position and the second slot position in response to detecting the preprogrammed aircraft maneuver.

For example, the movable band 230 may normally be in the third slot position during cruise so that minimal additional stall margin is created, but performance is not compromised. The cruise condition included in the preselected operating conditions corresponds when the aircraft is in the cruise portion of the flight cycle.

Then, when the control unit 234 detects a preprogrammed aircraft maneuver, i.e. banks, turns, rolls, the control unit 234 directs the movable band 230 to rotate about the axis 11 to the first slot position or the second slot position to adjust the size of the slots. This allows for more radial and some forward flow compared to the third set of slots 240.

Conversely, when the control unit 234 detects the cruise condition after a preprogrammed aircraft maneuver, the control unit 234 directs the movable band 230 to move to the third slot position. Therefore, once the aircraft maneuver is completed, the movable band 230 moves to the third slot position so that performance is not compromised and the additional stall margin is removed during the cruise condition.

The preselected operating conditions may further include a sensor input from at least one sensor included in the control unit 234. The sensor 256 is configured to measure one of pressure, air speed, and acceleration. In some embodiments, the control unit 234 includes a plurality of sensors each configured to measure one of pressure, air speed, and acceleration.

The control unit 234 is configured to receive a measurement from the sensor or sensors and direct the movable band 230 to move to a corresponding position in response to the measurement of the at least one sensor. The control unit 234 may be configured to direct the movable band 230 to be in the third slot position when the measurements from the sensor are within a predetermined threshold.

Then, when the measurement from the sensor is outside of the predetermined threshold, the control unit 234 directs the movable band 230 to move to the first slot position or second slot position. In some embodiments, the control unit 234 may be configured to use a combination of the sensor measurements and the detected preprogrammed aircraft maneuver to control the position of the movable band 230 as described above.

The movable band 230 is shaped to define a first set of pockets 242 and a second set of pockets 244 as shown in FIGS. 2-4. Each pocket 244 of the second set of pockets 244 are arranged circumferentially between adjacent pockets 242 of the first set of pockets 242. In the illustrative embodiments, the movable band 230 has a gap between the first and second groves 242, 244 where that is no pocket as shown FIG. 8.

The first set of pockets 242 align with the plurality of openings 228 to define the first set of slots when the movable band 230 is in the first slot position. The second set of pockets 244 align with the plurality of openings 228 to define the second set of slots when the movable band 230 is in the second slot position.

The first set of pockets 242 extend radially into an inner surface 230S of the movable band 230 as shown in FIG. 8. The first set of pockets 242 extend radially into the inner surface 230S to a first pocket depth 242D.

The second set of pockets 244 extend radially into the inner surface 230S of the movable band 230 as shown in FIG. 8. The second set of pockets 244 extend radially into the inner surface 230S to a second pocket depth 244D.

In the illustrative embodiment, the inner surface 230S of the movable band 230 cooperates with the openings 228 to define the slots 240. In some embodiments, the movable band 230 has a third set of pockets 246 that align with the openings 228 to define the third set of slots 240 as suggested in FIGS. 7 and 8. The third set of pockets 246 extend radially into the inner surface 230S to a third pocket depth 246D. In the illustrative embodiment, the first set of pockets 242, the second set of pockets 244, and the third set of pockets 246 are arranged in a repeating series.

A method of operating the inlet distortion mitigation system 224 may include several steps. During normal cruise conditions, the control unit 234 may move the movable band 230 to the third slot position. If the control unit 234 detects one of the preselected operating conditions other than the cruise condition, the control unit 234 directs the movable band 30 to rotate to the first slot position or the second slot position to minimize the negative pressure and swirl distortions to improve stall margin of the gas turbine engine 110.

The method further includes continually adjusting the position of the movable band 230 based on the preselected operating conditions of the engine 110. If the control unit 234 detects the cruise condition, the control unit 234 is configured to move the movable band 30 back to the third slot position. In other instances, the control unit 234 is configured to control the position of the movable band 230 as discussed above based on the preprogrammed aircraft maneuvers and/or the measurements from the sensors.

Another embodiment of a fan case assembly 310 in accordance with the present disclosure is shown in FIGS. 9-12B. The fan case assembly 310 is substantially similar to the fan case assembly 10 shown in FIGS. 1-6B and described herein. Accordingly, similar reference numbers in the 300 series indicate features that are common between the fan case assembly 10 and the fan case assembly 310. The description of the fan case assembly 10 is incorporated by reference to apply to the fan case assembly 310, except in instances when it conflicts with the specific description and the drawings of the fan case assembly 310.

Figure 9:
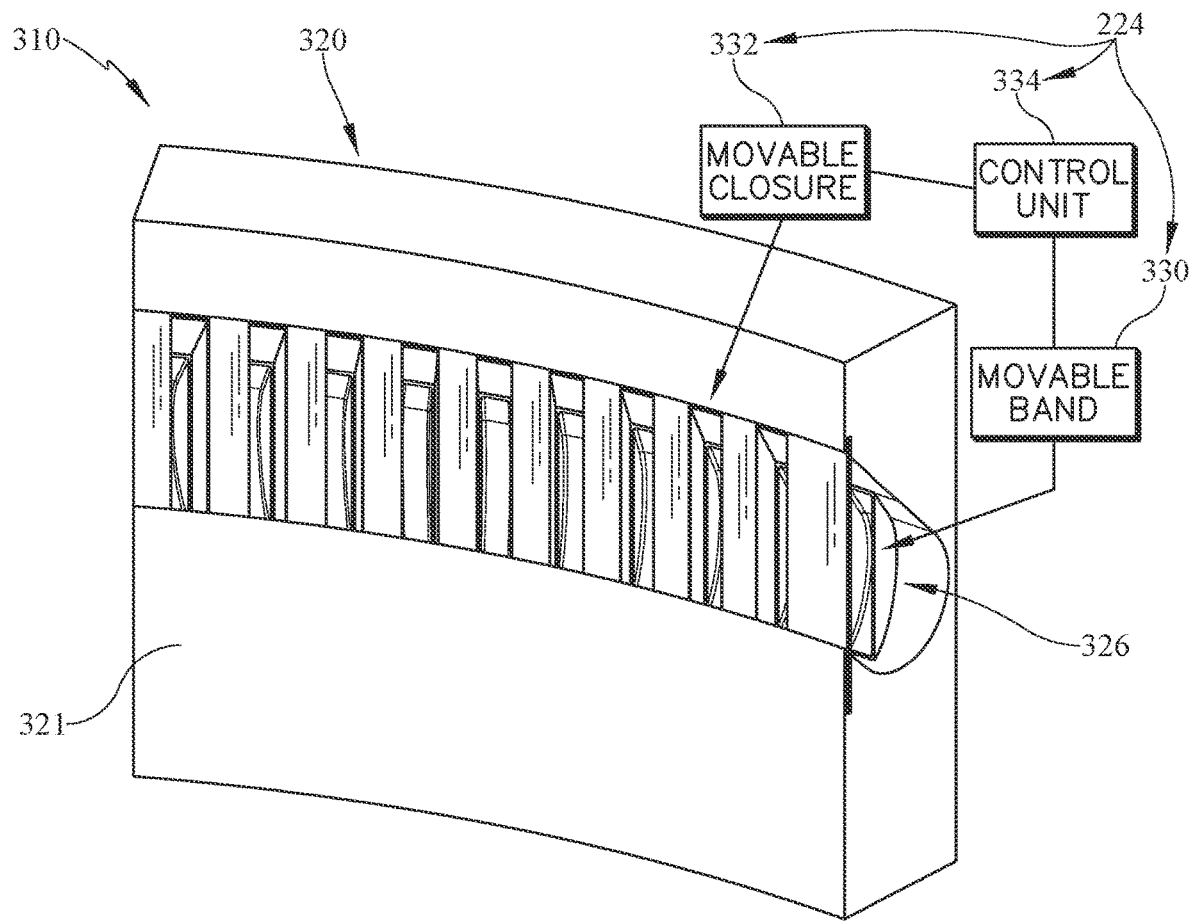
FIG. 9 is a perspective view of another embodiment of a fan case assembly included in the gas turbine engine of FIG. 1 showing the fan case assembly includes a case that defines a channel, a plurality of a plurality of vanes arranged in the channel to form a plurality of openings open to the gas path, and an inlet distortion mitigation system that includes a movable band mounted for rotation about the axis relative to the case to control the depth of the slots between the plurality of vanes and a movable closure mounted for movement relative to the case and configured to rotate about the axis relative to the case to move between a closed position FIG. 8A and an open position as shown in FIG. 9A to control fluid communication between the gas path and the first and second set of slots.
Figure 10:
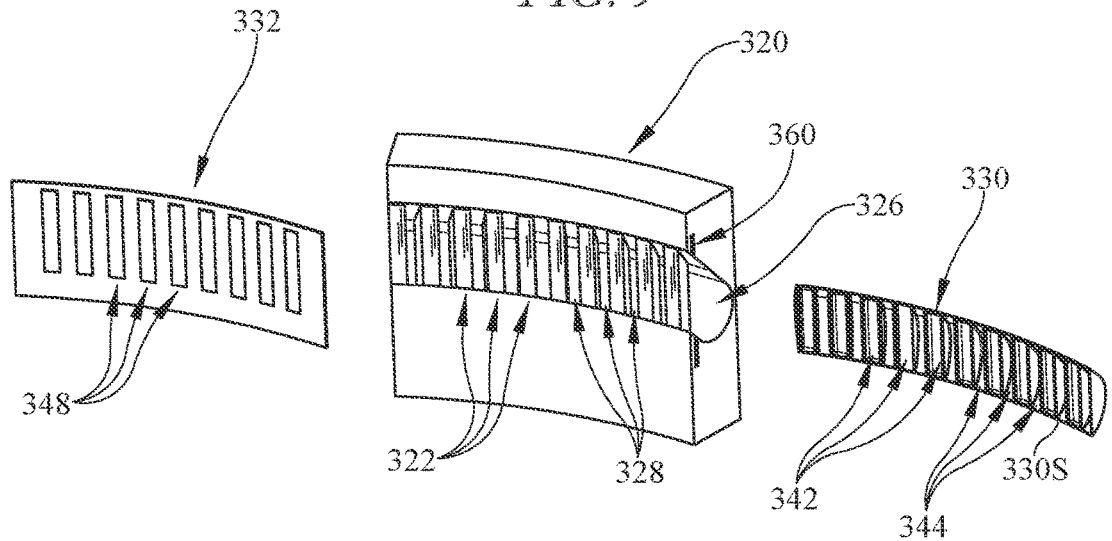
FIG. 10 is an exploded view of the fan case assembly of FIG. 8 showing the movable closure includes a plurality of apertures that align with the plurality of openings defined between the vanes when the movable closure is in the open position.

The fan case assembly 310 includes, among other components, a case 320, a plurality of vanes 322, and an inlet distortion mitigation system 324 as shown in FIGS. 9 and 10. The case 320 extends circumferentially at least partway about the axis 11. The case 320 is formed to define a channel 326 that extends circumferentially at least partway about the axis 11. The plurality of vanes 322 are arranged in the channel 326. The plurality of vanes 322 are spaced apart circumferentially about the axis 11 to define a plurality of openings 328 in fluid communication with the channel 326.

The inlet distortion mitigation system 324 is configured to control the depth of slots formed between the plurality of vanes 322.

Figure 11A:
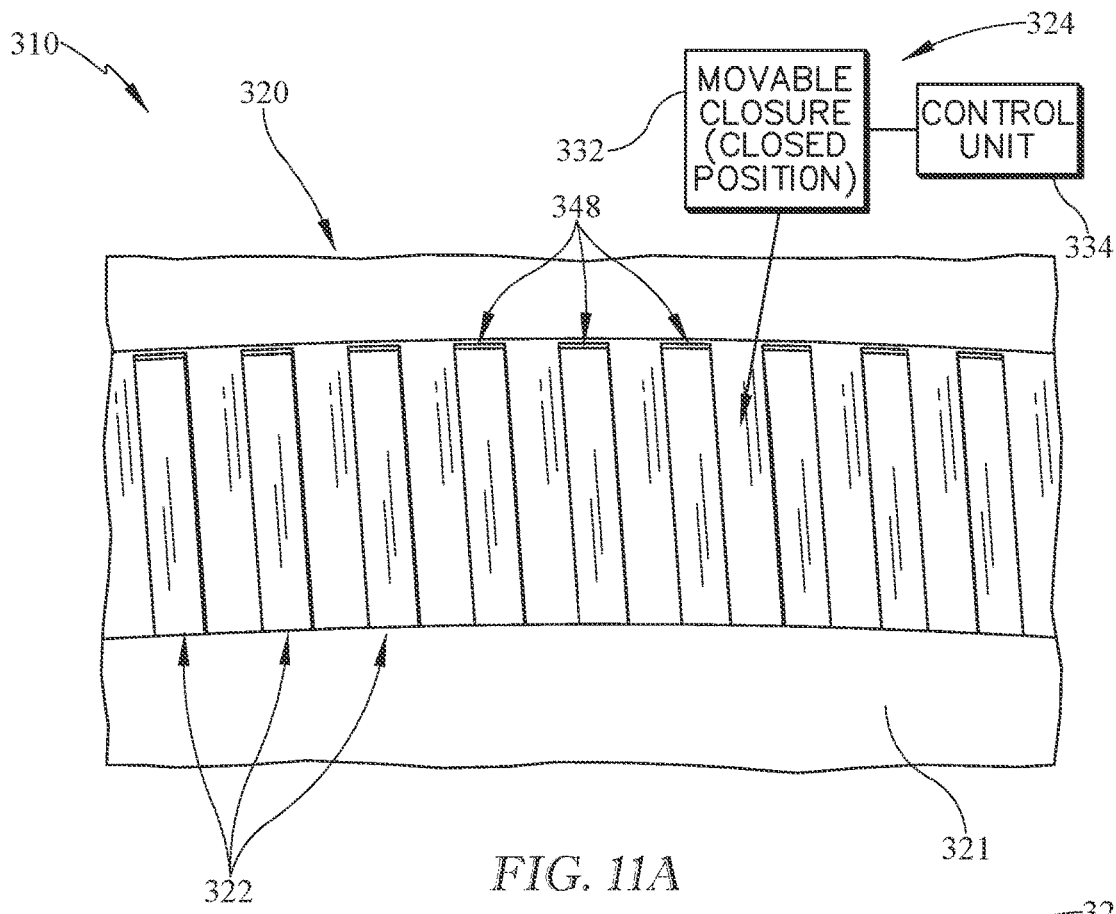
FIG. 11A is a radially-outwardly facing view of the fan case assembly of FIG. 9 with the movable closure in the closed position.
Figure 11B:
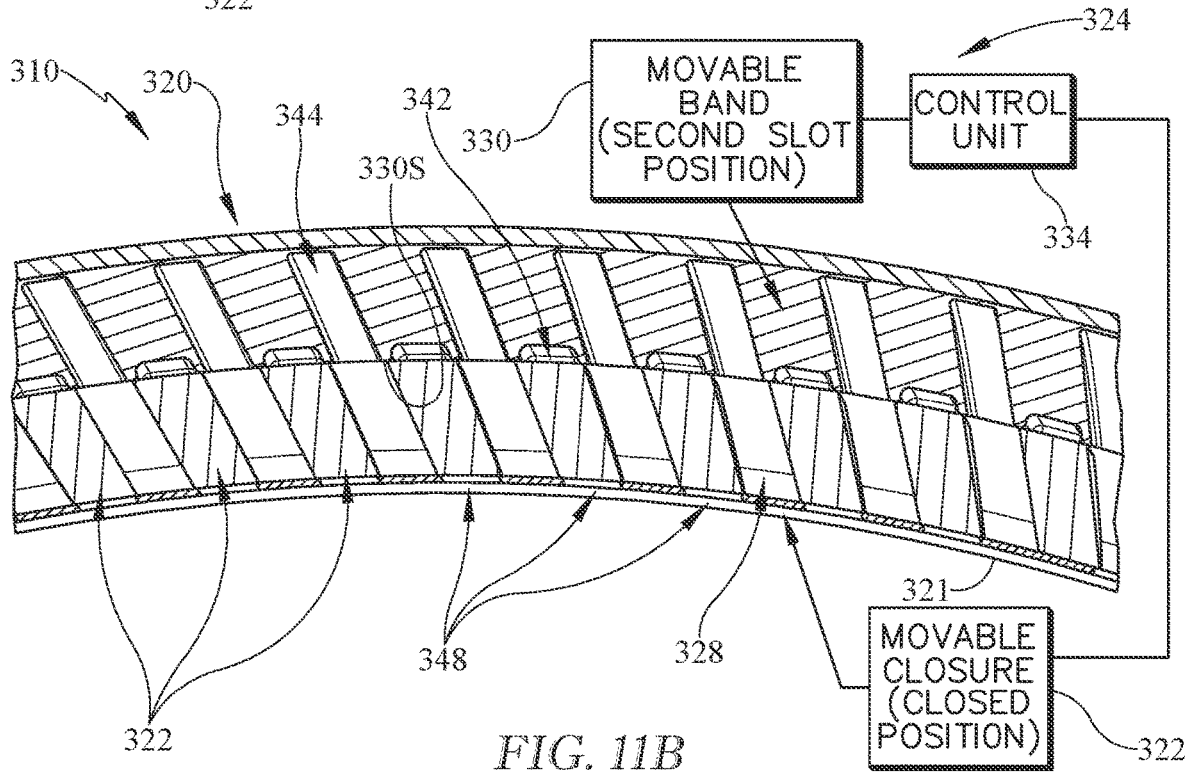
FIG. 11B is a cross-section view of the fan case assembly of FIG. 11A showing the movable closure covers the plurality of openings to the channel to block fluid communication between the gas path and the first or second set of slots.
Figure 12A:
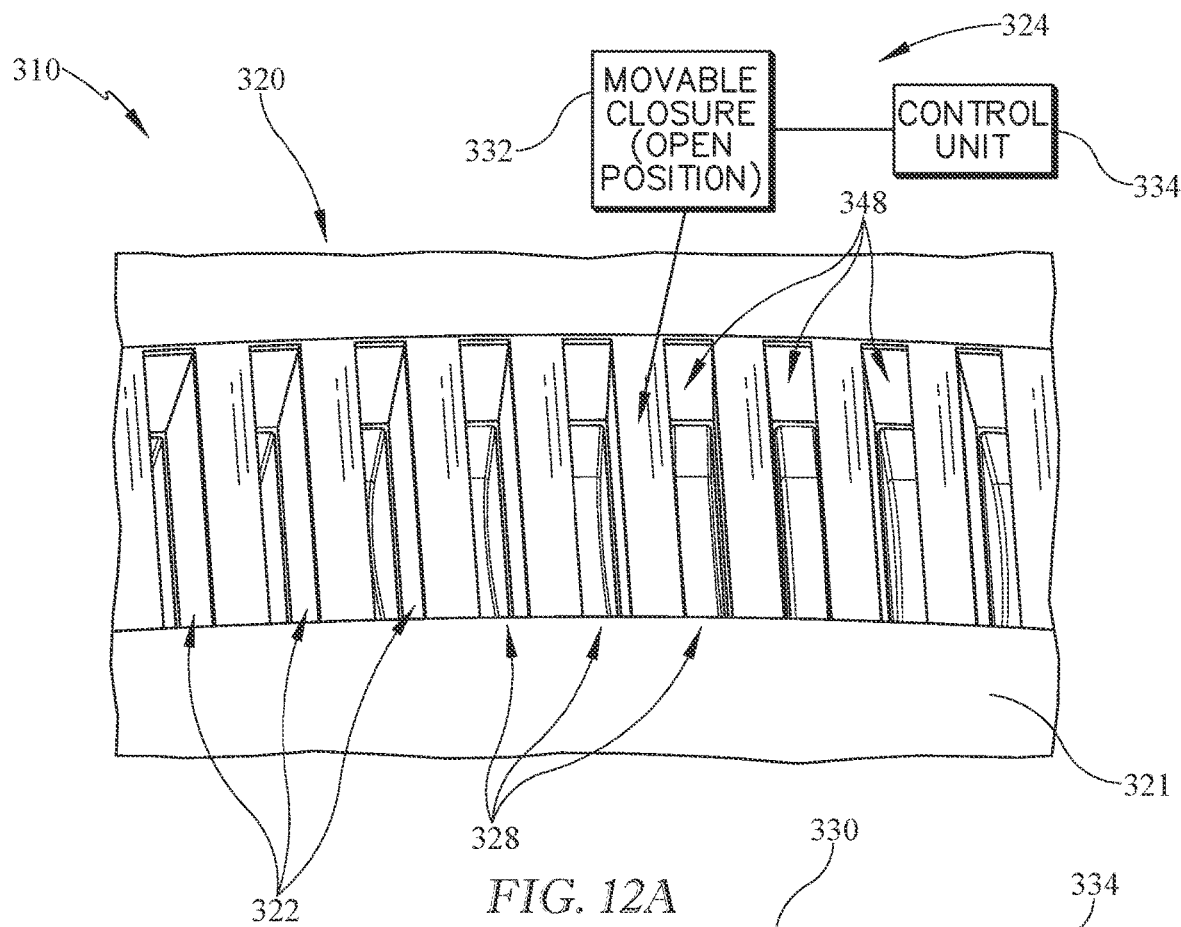
FIG. 12A is a radially-outwardly facing view of the fan case assembly of FIG. 9 with the movable closure in the open position.
Figure 12B:
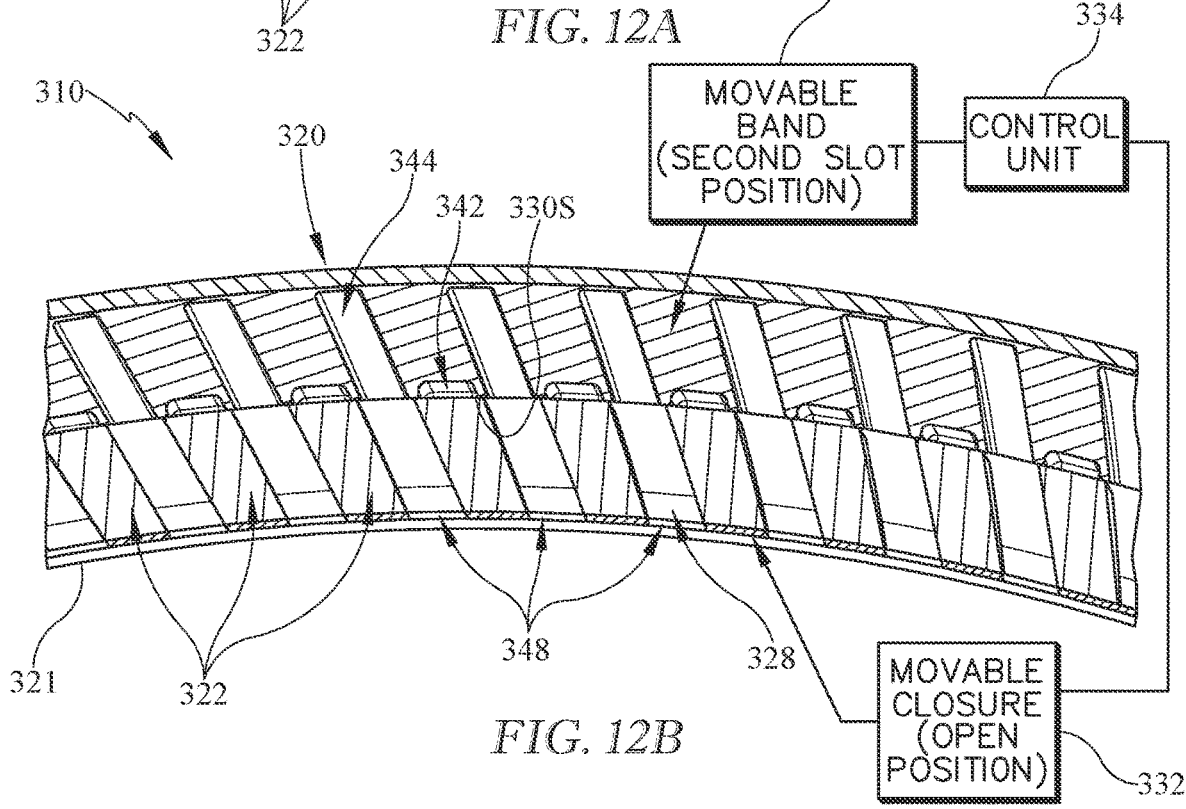
FIG. 12B is a cross-section view of the fan case assembly of FIG. 12A showing the plurality of apertures formed in the moveable closure are aligned with the plurality of openings to allow fluid communication between the gas path and the first or second set of slots.

The inlet distortion mitigation system 324 includes a movable band 330, a movable closure 332, and a control unit 334 as shown in FIGS. 9, 11A-B, and 12A-B. The movable band 330 is mounted for rotation about the axis 11 relative to the case 320 between a first slot position and a second slot position. The movable closure 332 is mounted for rotation about the axis 11 relative to the case 320 between a closed position as shown in FIGS. 11A and 11B and an open position as shown in FIGS. 12A and 12B.

In the closed position, the movable closure 332 covers the plurality of openings 328 to block fluid communication between the gas path 25 and the one of the either set of slots 336, 338 formed by the plurality of vanes 322 and the movable band 330. In the open position, a plurality of apertures 348 in the movable closure 332 are aligned with the plurality of openings 328 to allow fluid communication between the gas path 25 and either set of slots 336, 338.

The control unit 334 is configured to rotate the movable band 330 and/or the movable closure 332 between the different positions in response to preselected operating conditions to control the depth of slots formed between the plurality of vanes 322 and to control fluid communication between the gas path 25 and the different slots 336, 338 formed between the vanes 322.

Unlike the embodiment of FIGS. 3-4, the fan case assembly 310 includes the movable closure 332 so as to be able to close off fluid communication to the slots 336, 338 between the vanes 322. When in the closed position, no additional stall margin is created, but overall efficiency of the gas turbine engine 110 is maintained.

The control unit 334 is configured to move the movable band 330 between the first and second slot positions and to move the movable closure 332 between the closed and open positions in response to preselected operating conditions. The preselected operating conditions include a plurality of preprogrammed aircraft maneuvers stored on a memory 254 included in the control unit 334. The plurality of preprogrammed aircraft maneuvers include banks, turns, rolls, etc.

The control unit 334 is configured to detect a preprogrammed aircraft maneuver included in the plurality of preprogrammed aircraft maneuvers on the memory 254. Once the preprogrammed aircraft maneuver is detected, the control unit 34 directs the movable closure 332 to move to the open position and the movable band 330 to move to one of the first slot position and the second slot position in response to detecting the preprogrammed aircraft maneuver.

For example, the movable closure 332 may normally be in closed position during cruise to cover the plurality of openings 328 so that no additional stall margin is created, but performance is not compromised. Then, when the control unit 334 detects a preprogrammed aircraft maneuver, i.e. banks, turns, rolls, the control unit 334 directs the movable closure 332 to rotate about the axis 11 to the open position so that the openings 328 formed between the vanes 322 are uncovered.

Additionally, the control unit 334 is also configured to direct the movable band 330 to rotate about the axis 11 to one of the first and second slot positions when the control unit 334 detects a preprogrammed aircraft maneuver associated therewith. When the control unit 334 detects the preprogrammed aircraft maneuver, i.e. banks, turns, rolls, the control unit 334 directs the movable closure 332 to move to the open position, while simultaneously directing the movable band 330 to move to one of the first and second slot positions.

In some embodiments, the movable band 330 may normally be in the first slot position when the movable closure 332 is in the closed position. In some embodiments, the movable band 330 may normally be in the second slot position when the movable closure 332 is in the closed position.

The control unit 334 may direct the movable band 330 to either stay in the current slot position, i.e. the first slot position or the second slot position, when the movable closure 332 is moved to the open position. Alternatively, the control unit 334 may direct the movable band 330 to move to the other slot position when the movable closure 332 moved to the open position. The control unit 334 directs the movable band 330 to rotate about the axis 11 to the second slot position so that the second set of slots 338 are formed. This allows for more radial and some forward flow compared to the first set of slots 36.

The preselected operating conditions may further include a sensor input from at least one sensor included in the control unit 334. The sensor is configured to measure one of pressure, air speed, and acceleration. In some embodiments, the control unit 334 includes a plurality of sensors each configured to measure one of pressure, air speed, and acceleration.

The control unit 334 is configured to receive a measurement from the at least one sensor or sensors and direct the movable closure 332 and/or the movable band 330 to move to a corresponding position in response to the measurement of the at least one sensor. The control unit 334 may be configured to direct the movable closure 332 to be in the closed position when the measurements from the sensor are within a predetermined threshold.

Then, when the measurement from the sensor is outside of the predetermined threshold, the control unit 334 directs the movable closure 332 to move to the open position. Simultaneously, the control unit 334 may direct the movable band 330 to be in the appropriate position as the movable closure 332 is moved to the open position.

In some embodiments, the control unit 334 may be configured to use a combination of the sensor measurements and the detected preprogrammed aircraft maneuver to control the position of the movable band 30. For example, when the control unit 334 detects a preprogrammed aircraft maneuver and the measurement is outside of the predetermined threshold, the control unit 334 directs the movable closure 332 rotate to the open position.

In some embodiments, the control unit 334 is configured to use the measurements from the sensor to anticipate the aircraft maneuver. The control unit 334 is configured to direct the movable closure 332 to move to the open position in response to the measurement from the sensor even though no preprogrammed aircraft maneuver is detected.

Alternatively, there may be a delay in the measurements from the sensor. Therefore, the control unit 334 is also configured to direct the movable closure 332 to move to the open position when the one of the preprogrammed aircraft maneuvers is detected, even though the measurements from the sensor are within the predetermined thresholds.

In some embodiments, the control unit 334 may detect one of the preprogrammed aircraft maneuvers, but the measurements from the sensors are within the predetermined threshold. If so, the control unit 334 may direct the movable closure 332 to remain in the current position.

The movable band 330 is shaped to define a first set of pockets 342 and a second set of pockets 344 as shown in FIGS. 9-12B. Each pocket 344 of the second set of pockets 344 are arranged circumferentially between adjacent pockets 342 of the first set of pockets 342.

The first set of pockets 342 align with the plurality of openings 328 to define the first set of slots 336 when the movable band 330 is in the first slot position. The second set of pockets 344 align with the plurality of openings 328 to define the second set of slots 338 when the movable band 330 is in the second slot position.

The first set of pockets 342 extend radially into an inner surface 330S of the movable band 330 as shown in FIGS. 11B and 12B. The first set of pockets 342 extend radially into the inner surface 330S to a first pocket depth 342D.

The second set of pockets 344 extend radially into the inner surface 330S of the movable band 330 as shown in FIGS. 11B and 12B. The second set of pockets 344 extend radially into the inner surface 330S to a second pocket depth 344D.

In the illustrative embodiment, the case 320 is further shaped to include a channel 360 as shown in FIG. 10. The channel 360 extends circumferentially at least partway about the axis 11. The channel 360 is spaced radially outward of an inner surface 321 of the case 320 that defines the outer boundary of the gas path 25 as shown in FIG. 10. Therefore, the movable closure 332 is spaced radially outward from the inner surface 321 so that a radial offset is formed therebetween. In other embodiments, the movable closure 332 defines a portion of the outer boundary of the gas path 25.

Each of the vanes 322 extends axially across the channel 326 as shown in FIGS. 11A and 12A. In the illustrative embodiment, the vanes 322 are tilted circumferentially relative to the axis 11.

A method of operating the inlet distortion mitigation system 324 may include several steps. During normal cruise conditions, the control unit 334 may move the movable closure 332 to the closed position. In the cruise condition, the movable band 330 may be in any slot position. If the control unit 334 detects one of the preselected operating conditions other than the cruise condition, the control unit 334 directs the movable closure 332 to move to the open position. Simultaneously, the control unit 334 directs the movable band 30 to rotate to the desired slot position.

The method further includes continually adjusting the position of the movable band 330 based on the preselected operating conditions of the engine 110. If the control unit 334 detects the cruise condition, the control unit 334 is configured to move the movable closure 332 back to the closed position. In other instances, the control unit 334 is configured to control the position of the movable band 330 and the movable closure 332 as discussed above based on the preprogrammed aircraft maneuvers and/or the measurements from the sensors.

The method further includes locating the movable closure 332 in the closed position. During normal cruise conditions, the movable closure 332 covers the plurality of openings 328 to block fluid communication between the gas path 25 and one of the first set of slots 336 and the second set of slots 338.

The method further includes continually adjusting the position of the movable closure 332 based on the preselected operating conditions of the engine 110. If the control unit 334 detects the one of the preselected operating conditions, the method may include translating the movable closure 332 from the closed position to the open position.

When dealing with embedded inlet distortion, there may be a steep trade between stall margin and performance of the engine. There may be points during a mission or moments with maneuvers where it may be desirable to incorporate a different available stall margin. Attempting to solve the worst stall condition, while maintaining performance over all of the cycle or flight conditions may be difficult and result in compromised efficiency or a limited flight envelope.

Therefore, the fan 112 includes an inlet distortion mitigation system 24, 224, 324 which includes the movable band 30, 230, 330 configured to control depths of slots formed between adjacent vans 22, 222, 322 in the channel 26, 226, 326. The channel 26, 226, 326 is formed in the case 20, 220, 320 at the leading edge 16 of the fan blades 14. The plurality of vanes 22, 222, 322 are arranged in the channel 26, 226, 326.

The movable band 30, 230, 330 is located in the channel 26, 226, 326. The movable band 30, 230, 330 that has two features milled into its inner diameter or inner surface 30S, 230S, 330S. In the first condition, there is a short pocket 42, 242, 342, but generally limited to form a shallow axial slot in combination with the movable band 30, 230, 330. In a second condition, there is a shelled pocket 44, 244, 344 that allows for more radial and some forward flow. This may permit higher stall margin relative to the more limited pocket 42, 242, 342.

Additionally, there may be an inner-most ring or movable closure 332 that is able to be opened to permit flow into the axial slots 336, 338, or be closed off to have no additional stall margin. In the closed position, there may be no additional stall margin, but the system may retain better performance. Alternatively, the movable closure 332 may be axial in nature.

This permits some stall margin benefit in the first condition and then an enhanced capability when needed, with rotation of the movable band 30, 230, 330 and/or the movable closure 332. It permits the engine 110 to be designed with three potential configurations, which allow it to be optimized to different conditions with one assembly. This is beneficial to eliminating a troublesome trade between stall margin and performance potentially, or the system may be able to handle more extreme inlet distortion during maneuvering.

In some embodiments, instead of the movable band 330 closing off the tip treatment, the pockets 42, 242, 342 may be very shallow and give only a little benefit with very little efficiency debit. The pockets 42, 242, 342 may be open all the time such that the second set of pockets 44, 244, 344 are activated when needed.

The fan case assembly 10, 210, 310 includes the case 20, 220, 320 and the vanes 22, 222, 322 that leading to the movable band 30, 230, 330. The movable band 30, 230, 330 includes pockets 42, 44, 242, 244, 342, 344. The pockets 42, 44, 242, 244, 342, 344 may be skewed to the side. The fore/aft walls of each vane 22, 222, 322 are angled as well. When the movable band 30, 230, 330 is rotated about the axis 11, the pockets 44, 244, 344 align with the openings 28, 228, 328. In some embodiments, the movable band 30, 230, 330 rotates about 1.5 degrees.

Forward leaning cross-section shaped channels 26, 226, 326 may be an effective tip treatment that recirculate air locally at the fan blade leading edge tip. The vanes 22, 222, 322 may be leaned tangentially as well as leaned forward. The concept may include skewed tangentially openings 28, 228, 328. This might make the slots/openings aligned to the blade angle instead of purely axial at the opening.

Incorporation of a movable closure 332 with around 50% openness may permits either tip treatment to be closed off from flow path, reducing efficiency debit for such when the stall margin is not needed. This may provide three potential modes: 1) no treatment (closed mode), 2) first set of pockets 42, and 3) second set of pockets 44, all in one system/ configuration.

The movable closure 332 may be directly on flow path, or just between it and the radial openings to control the activation or elimination of tip treatment benefit. It may be cleanest to have this directly on the inner surface 321. In some embodiments, the movable closure 332 may extend forward and aft of the openings and include a coating or material that is tip rub tolerant. Another potential embodiment may be to have some portions of the circumference not treated and allow for sectors to be operated independently (avoids clash between an open and closed section next to each other).

The control unit 34, 234, 334 is configured to use sensor inputs from a sensor 56 to control operation of the movable band 30, 230, 330. The sensor 56 may include one of or a combination of a static wall pressure sensor, an altitude sensor, sensors configured to detect twisting of the fan blades 14, sensors configured to detect the tip timing of the fan blades 14, sensors configured to measure a rotational speed of the fan blades 14, a dynamic pressure transducer sensor. The combination of some sensors may provide data to engage mitigation of the effects of distortion, while other sensors may detect the maneuvers or mission phase.

For example, altitude and fan speed may provide data to engage mitigation, while also providing maneuver detection or regime/mission phase framing of control logic. Additionally, static wall pressure, dynamic pressure transducers, blade tip timing, blade untwist as well as fan speed and altitude may be used in distortion/effect detection for the control logic.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A fan case assembly adapted for use with a gas turbine engine, the fan case assembly comprising:

a case that extends circumferentially at least partway about an axis to define an outer boundary of a gas path of the gas turbine engine, the case formed to define a channel that extends circumferentially at least partway about the axis, a plurality of vanes arranged in the channel and spaced apart circumferentially about the axis to define a plurality of openings open to the gas path of the gas turbine engine, and an inlet distortion mitigation system including a movable band arranged in the channel radially outward of the plurality of vanes and mounted for movement relative to the case and a control unit, the movable band configured to rotate about the axis relative to the case to move between a first slot position in which the movable band cooperates with the plurality of vanes to define a first set of slots having a first slot depth and a second slot position in which the movable band cooperates with the plurality of vanes to define a second set of slots having a second slot depth that is greater than the first slot depth, and the control unit configured to move the movable band between the first slot position and the second slot position in response to preselected operating conditions to minimize negative effects pressure and swirl distortions in the gas turbine engine to improve stall margin.

2. The fan case assembly of claim 1, wherein the movable band is shaped to define a first set of pockets that extend radially to a first pocket depth and the first set of pockets align with the plurality of openings to define the first set of slots when the movable band is in the first slot position.

3. The fan case assembly of claim 2, wherein the movable band is shaped to define a second set of pockets circumferentially between the first set of pockets that extend radially to a second pocket depth and the second set of pockets align with the plurality of openings to define the second set of slots when the movable band is in the second slot position, wherein the second pocket depth of the second set of pockets is greater than the first pocket depth of the first set of pockets.

4. The fan case assembly of claim 3, wherein the inlet distortion mitigation system further includes a movable closure mounted for movement relative to the case and configured to rotate about the axis relative to the case to move between a closed position in which the movable closure covers the plurality of openings to block fluid communication between the gas path and one of the first set of pockets and the second set of pockets and an open position in which a plurality of apertures in the movable closure are aligned with the plurality of openings to allow fluid communication between the gas path and the one of the first set of pockets and the second set of pockets, and wherein the control unit is configured to move the movable closure between the closed position and the open position in response to the preselected operating conditions.

5. The fan case assembly of claim 2, wherein the movable band cooperates with the plurality of vanes to define a third set of slots having a third slot depth and the control unit is configured to move the movable band between the first slot position, the second slot position, and a third slot position in response to the preselected operating conditions.

6. The fan case assembly of claim 1, wherein the inlet distortion mitigation system further includes a movable closure mounted for movement relative to the case and configured to rotate about the axis relative to the case to move between a closed position in which the movable closure covers the plurality of openings to block fluid communication between the gas path and one of the first set of slots and the second set of slots and an open position in which a plurality of apertures in the movable closure are aligned with the plurality of openings to allow fluid communication between the gas path and the one of the first set of slots and the second set of slots, and wherein the control unit is configured to move the movable closure between the closed position and the open position in response to the preselected operating conditions.

7. The fan case assembly of claim 1, wherein the control unit includes at least one actuator coupled to the movable band and configured to drive rotation of the movable band, a controller coupled to the at least one actuator and configured to direct the at least one actuator to rotate the movable band to the first slot position when the gas turbine engine is in a cruise condition included in the preselected operating conditions.

8. The fan case assembly of claim 7, wherein the control unit further includes a memory coupled to the controller, the memory including a plurality of preprogrammed aircraft maneuvers that each correspond to one of the first slot position and the second slot position, and the controller is configured to detect a preprogrammed aircraft maneuver included in the plurality of preprogrammed aircraft maneuvers on the memory and direct the at least one actuator to move the movable band to a corresponding position in response to detecting the preprogrammed aircraft maneuver.

9. The fan case assembly of claim 8, wherein the control unit further includes at least one sensor coupled to the controller and configured to measure one of pressure, air speed, altitude, blade tip timing, blade rotational speed, attitude, and acceleration, and wherein the controller is configured to receive a measurement from the at least one sensor and direct the at least one actuator to move the movable band to a corresponding position in response to the measurement of the at least one sensor.

10. The fan case assembly of claim 7, wherein the control unit further includes at least one sensor coupled to the controller and configured to measure one of pressure, air speed, altitude, blade tip timing, blade rotational speed, attitude, and acceleration, and wherein the controller is configured to receive a measurement from the at least one sensor and direct the at least one actuator to move the movable band to a corresponding position in response to the measurement of the at least one sensor.

11. A gas turbine engine comprising:
a fan including a fan rotor configured to rotate about an axis of the gas turbine engine and a plurality of fan blades coupled to the fan rotor for rotation therewith,
a fan case assembly that extends circumferentially around the plurality of fan blades radially outward of the plurality of fan blades, the fan case assembly comprising:
a case that extends circumferentially at least partway about the axis, the case formed to define a channel that extends circumferentially at least partway about the axis,
a plurality of vanes arranged in the channel and spaced apart circumferentially about the axis to define a plurality of openings open to a gas path of the gas turbine engine, and
an inlet distortion mitigation system including a movable band arranged in the channel radially outward of the plurality of vanes and mounted for movement relative to the case and a control unit, the movable band configured to rotate about the axis relative to the case to move between a first slot position in which the movable band cooperates with the plurality of vanes to define a first set of slots having a first slot depth and a second slot position in which the movable band cooperates with the plurality of vanes to define a second set of slots having a second slot depth that is different than the first slot depth, and the control unit configured to move the movable band between the first slot position and the second slot position in response to preselected operating conditions.

12. The gas turbine engine of claim 11, wherein the movable band is shaped to define a first set of pockets that extend radially to a first pocket depth and the first set of pockets align with the plurality of openings to define the first set of slots when the movable band is in the first slot position.

13. The gas turbine engine of claim 12, wherein the movable band is shaped to define a second set of pockets circumferentially between the first set of pockets that extend radially to a second pocket depth and the second set of pockets align with the plurality of openings to define the second set of slots when the movable band is in the second slot position, wherein the second pocket depth of the second set of pockets is greater than the first pocket depth of the first set of pockets.

14. The gas turbine engine of claim 12, wherein the movable band cooperates with the plurality of vanes to define a third set of slots having a third slot depth and the control unit is configured to move the movable band between the first slot position, the second slot position, and a third slot position in response to the preselected operating conditions.

15. The gas turbine engine of claim 11, wherein the inlet distortion mitigation system further includes a movable closure mounted for movement relative to the case and configured to rotate about the axis relative to the case to move between a closed position in which the movable closure covers the plurality of openings to block fluid communication between the gas path and one of the first set of slots and the second set of slots and an open position in which a plurality of apertures in the movable closure are aligned with the plurality of openings to allow fluid communication between the gas path and the one of the first set of slots and the second set of slots, and wherein the control unit is configured to move the movable closure between the closed position and the open position in response to the preselected operating conditions.

16. The gas turbine engine of claim 11, wherein the control unit includes at least one actuator coupled to the movable band and configured to drive rotation of the movable band, a controller coupled to the at least one actuator and configured to direct the at least one actuator to rotate the movable band to the closed position when the gas turbine engine is in a cruise condition included in the preselected operating conditions.

17. The gas turbine engine of claim 16, wherein the control unit further includes a memory coupled to the controller, the memory including a plurality of preprogrammed aircraft maneuvers that each correspond to one of the first slot position and the second slot position, and the controller is configured to detect a preprogrammed aircraft maneuver included in the plurality of preprogrammed aircraft maneuvers on the memory and direct the at least one actuator to move the movable band to a corresponding position in response to detecting the preprogrammed aircraft maneuver.

18. The gas turbine engine of claim 16, wherein the control unit further includes at least one sensor coupled to the controller and configured to measure one of pressure, air speed, altitude, blade tip timing, blade rotational speed, attitude, and acceleration, and wherein the controller is configured to receive a measurement from the at least one sensor and direct the at least one actuator to move the movable band to a corresponding position in response to the measurement of the at least one sensor.

19. A method comprising:

providing a fan case assembly adapted for use with a gas turbine engine, the fan case assembly including a case that extends circumferentially at least partway about an axis of the gas turbine engine and is formed to define a channel that extends circumferentially at least partway about the axis, a plurality of vanes arranged in the channel and spaced apart circumferentially about the axis to define a plurality of inlet openings open to a gas path of the gas turbine engine, and an inlet distortion mitigation system including a movable band mounted for rotation about the axis relative to the case, locating the movable band in a first slot position in which the movable band cooperates with the plurality of vanes to define a first set of slots having a first slot depth, rotating the movable band from the first slot position to a second slot position in which the movable band cooperates with the plurality of vanes to define a second set of slots having a second slot depth that is greater than the first slot depth in response to one preselected operating condition included in a plurality of preselected operating conditions.

20. The method of claim 19, wherein the inlet distortion mitigation system further includes a movable closure mounted for rotation about the axis relative to the case, and wherein the method further comprises:

locating the movable closure in a closed position in which the movable closure covers the plurality of openings to block fluid communication between the gas path and one of the first set of slots and the second set of slots, and rotating the movable closure from the closed position to an open position in which a plurality of apertures in the movable closure are aligned with the plurality of openings to allow fluid communication between the gas path and the one of the first set of slots and the second set of slots.

* * * * *